US011867388B2

(12) United States Patent
Qiu

(10) Patent No.: US 11,867,388 B2
(45) Date of Patent: Jan. 9, 2024

(54) LAMP AND ASSEMBLING METHOD THEREOF

(71) Applicant: NINGBO FUTAI ELECTRIC LIMITED, Ningbo (CN)

(72) Inventor: Fujun Qiu, Ningbo (CN)

(73) Assignee: Ningbo Futal Electric Limited, Ningbo (CN)

(*) Notice: Subject to any disclaimer, the term of this patent is extended or adjusted under 35 U.S.C. 154(b) by 514 days.

(21) Appl. No.: 17/049,334

(22) PCT Filed: Dec. 24, 2019

(86) PCT No.: PCT/CN2019/127932
§ 371 (c)(1),
(2) Date: Oct. 20, 2020

(87) PCT Pub. No.: WO2020/253189
PCT Pub. Date: Dec. 24, 2020

(65) Prior Publication Data

US 2023/0127751 A1 Apr. 27, 2023

(30) Foreign Application Priority Data

Jun. 17, 2019 (CN) ......................... 201910520536.9
Jun. 17, 2019 (CN) ......................... 201920906020.3
Nov. 20, 2019 (CN) ......................... 201922022693.5

(51) Int. Cl.
*F21V 5/00* (2018.01)
*F21L 4/02* (2006.01)
(Continued)

(52) U.S. Cl.
CPC ................ *F21V 5/006* (2013.01); *F21L 4/02* (2013.01); *F21V 5/08* (2013.01); *F21V 7/0008* (2013.01);
(Continued)

(58) Field of Classification Search
CPC .. F21L 4/027; F21Y 2107/20; F21Y 2107/30; F21Y 2107/40; F21V 7/0008
See application file for complete search history.

(56) References Cited

U.S. PATENT DOCUMENTS 10,151,444 B1 * 12/2018 Tsai ...................... F21V 7/0083
2016/0360585 A1 * 12/2016 Urry ........................ F21V 33/00
2017/0152997 A1 * 6/2017 Plott ..................... F21V 21/406

FOREIGN PATENT DOCUMENTS

CN 201739779 U * 2/2011
CN 206918723 U * 1/2018
CN 108266700 A * 7/2018 ............ F21V 19/003

OTHER PUBLICATIONS

Machine translation of CN 201739779 U retrieved from the FIT database of PE2E search. (Year: 2023).*

(Continued)

*Primary Examiner* — Colin J Cattanach
(74) *Attorney, Agent, or Firm* — David & Raymond Patent Firm; Raymond Y Chan

(57) ABSTRACT

A lamp includes at least two illumination parts and a lamp body. The lamp body has an upper portion, a lower portion corresponding to the upper portion and at least two optical cavities extended between the upper portion and the lower portion. The illumination parts are respectively arranged in the optical cavities. The lamp has a surrounding lighting state and a side lighting state. The lighting states of the lamp may be switched between the surrounding lighting state and the side lighting state through controlling the operating modes of the illumination parts in the optical cavities respectively.

20 Claims, 19 Drawing Sheets

(51) Int. Cl.

| | |
|---|---|
| ***F21V 5/08*** | (2006.01) |
| ***F21Y 107/20*** | (2016.01) |
| ***F21Y 107/40*** | (2016.01) |
| ***F21Y 107/30*** | (2016.01) |
| ***F21V 7/00*** | (2006.01) |

(52) U.S. Cl.
CPC ....... *F21Y 2107/20* (2016.08); *F21Y 2107/30* (2016.08); *F21Y 2107/40* (2016.08)

(56) References Cited

OTHER PUBLICATIONS

Machine translation of CN 108266700 A retrieved from the FIT database of PE2E search. (Year: 2023).*

Machine translation of CN 206918723 U retrieved from the FIT database of PE2E search. (Year: 2023).*

* cited by examiner

LAMP AND ASSEMBLING METHOD THEREOF

BACKGROUND OF THE PRESENT INVENTION

Field of Invention

The present invention relates to illumination apparatus, and in particular, to a lamp and assembling method thereof, wherein the lamp has a surrounding lighting state and a side lighting state, and the lamp is arranged in a manner allowing the switching between the surrounding lighting state and the side lighting state.

Description of Related Arts

In recent years, more and more people feel like to camping outdoors, such as increasingly camping on a beach in the summer season. The booming camping activities stimulate a rapid development of camping lamps. A camping lamp is a lighting fixture capable of providing even and uniform light to the surrounding environment, which allows to be hung on the middle of a tent or other supports by the user so as for providing even and uniform light to the surrounding environment as well as for building a relaxing and joyful camping environment. It is well known that camping activities usually start in the late afternoon and evening. Natural light at then is relatively dim which renders poor visible scope. When the camping lamp can only provide even and uniform light to the surrounding, it becomes very difficult for a user who would like to look for something in the campsite (e.g. a mobile phone which screen haven't been lighted up). In order for dealing with such issue, the user is forced to prepare a condensation lighting fixture, such as a flashlight, before camping, for him/her to look for something in the campsite. Then, the user must bring more gears to the camping activities, which increases the burden of the user.

SUMMARY OF THE PRESENT INVENTION

An object of the present invention is to provide a lamp and assembling method thereof, wherein the lamp has a surrounding lighting state and a side lighting state, and the lamp is arranged in a manner allowing the switching between the surrounding lighting state and the side lighting stat, so as for the user to utilize the lamp in different applications and scenarios.

An object of the present invention is to provide a lamp and assembling method thereof, wherein the lamp is capable of repelling insects and functioning as an illumination means.

An object of the present invention is to provide a lamp and assembling method thereof, wherein at least a part of the lamp is capable of illuminating and repelling insects, and at least part of the lamp is capable of illuminating for lighting. In other words, the lamp of the present invention is capable of repelling insects through illuminating.

An object of the present invention is to provide a lamp and assembling method thereof, wherein the lamp in the side lighting state is capable of illuminating for repelling insects as well as illuminating for lighting.

An object of the present invention is to provide a lamp and assembling method thereof, wherein the lamp provides a lamp body and at least two illumination parts, wherein the lamp body has at least two optical cavities, respectively extended between the upper portion and the lower portion of the lamp body, wherein each of the illumination parts is arranged to be adapted to independently illuminate in the optical cavities respectively, so as to allow the lighting states of the lamp be controlled to switch between the surrounding lighting state and the side lighting state through controlling the operating modes of each of the illumination parts in the optical cavities respectively.

An object of the present invention is to provide a lamp and assembling method thereof, wherein the lamp body comprises a photopermeable side wall and a partition member arranged in the accommodation space of the side wall, so as to utilize the partition member to divide the side wall and to form at least two of the optical cavities and to utilize the side wall to form and construct the exterior of the lamp body, wherein the partition member is able to block the light of one of the optical cavities to enter the adjacent optical cavities, wherein the partition member is also capable of reinforcing the strength of the side wall, so as to avoid the side wall of the lamp body from distortion.

An object of the present invention is to provide a lamp and assembling method thereof, wherein the lamp provides a carrying part, arranged on the upper portion of the lamp body, so as to allow the lamp to be hand-held and utilized.

An object of the present invention is to provide a lamp and assembling method thereof, wherein the carrying part has at least a carrying groove arranged thereon, so that when the lamp is hung on a carrying body, the carrying body is able to be kept in the carrying groove of the carrying part, so as to stably hang the lamp on the carrying body.

An object of the present invention is to provide a lamp and assembling method thereof, wherein the lamp provides at least an insect repellent part, wherein the insect repellent part is arranged in the optical cavity and is capable of illuminating.

An object of the present invention is to provide a lamp and assembling method thereof, wherein one of the optical cavities of the lamp is capable of being utilized for illumination, while the other of the optical cavities is capable of being utilized for repelling insects, wherein the two of the optical cavities are arranged in a back-to-back manner.

An object of the present invention is to provide a lamp and assembling method thereof, wherein the lamp provides a partition member and a photopermeable wall, wherein the photopermeable wall surroundingly forms and defines the accommodation chamber, wherein the partition member divides the photopermeable wall to turn the accommodation chamber into at least two optical cavities, wherein the partition member is arranged to be opaque, so as to reduce the interference between the lights emitted from the two optical cavities.

An object of the present invention is to provide a lamp and assembling method thereof, wherein the lamp can be hung for use and be stably supported for use.

According to an aspect of the present invention, the present invention provides a lamp, including:

at least two illumination parts; and a lamp body, having an upper portion, a lower portion corresponding to the upper portion, and at least two optical cavities respectively extended from a direction of the upper portion to the lower portion, wherein each of the optical cavities has at least one of the illumination parts arranged in an inside thereof, wherein the lamp has a surrounding lighting state and a side lighting state, wherein the lighting states of the lamp is adapted to be switched between the surrounding lighting state and the side lighting state through controlling the operating modes of the illumination parts arranged in the optical cavities.

According to one embodiment of the present invention, the optical cavities of the lamp body are respectively extended from the upper portion of the lamp body to the lower portion.

According to one embodiment of the present invention, the lamp body comprises a photopermeable side wall and an opaque partition member, wherein the side wall has an accommodation space, wherein the partition member comprises a spacer body and at least two spacer boards, wherein the spacer body is kept in the accommodation space of the side wall, wherein the spacer boards are extended from the middle of the spacer body and the side wall in a spaced manner to each other, so as to form and define the optical cavities among the side wall, the spacer body, and adjacent the spacer boards.

According to one embodiment of the present invention, each of the spacer boards is respectively integrally formed on the spacer body, wherein each of the spacer boards is respectively extended from the spacer body to an inner wall attached on the side wall.

According to one embodiment of the present invention, each of the spacer boards is respectively integrally extended from the side wall, wherein each of the spacer boards is respectively extended from the side wall to an outer wall attached on the spacer body.

According to one embodiment of the present invention, a side of each of the spacer boards is extended to the outer wall attached on the spacer body respectively, wherein the other side of each of the spacer boards is extended to the inner wall attached on the side wall respectively.

According to one embodiment of the present invention, the lamp further comprises a circuit board, wherein the illumination parts are mounted on the circuit board, wherein the circuit board is arranged on the upper portion of the lamp body, so as to utilize the circuit board to close the upper opening of the optical cavities and to hold the illumination parts on the upper ends of the optical cavities.

According to one embodiment of the present invention, the lamp further comprises a circuit board, wherein the illumination parts are mounted on the circuit board, wherein the circuit board is arranged on the lower portion of the lamp body, so as to utilize the circuit board to close the lower opening of the optical cavities and to held the illumination parts on the lower ends of the optical cavities.

According to one embodiment of the present invention, the lamp body further comprises a lower cover body, integrally formed on the lower end of the partition member, wherein the lower cover body has a reflective oblique inner wall obliquely extended from the spacer body of the partition member to a peripheral direction of the lower cover body, wherein the lower cover body is arranged to close the lower opening of the optical cavities and to expose the oblique inner wall of the lower cover body to the optical cavities, wherein the illumination parts face toward the oblique inner wall of the lower cover body.

According to one embodiment of the present invention, at least one of the spacer boards of the partition member is extended upward to form a positioning bulge, wherein the circuit board has a positioning gap, wherein the positioning bulge of the spacer board is positioned at the positioning notch of the circuit board.

According to one embodiment of the present invention, the lamp further includes a base, arranged on the lower portion of the lamp body.

According to one embodiment of the present invention, the lamp further includes a base and a connection wire, wherein the base comprises a base body, a battery cartridge and a cartridge cover, wherein the base body is arranged on the lower portion of the lamp body, wherein the battery cartridge is arranged inside of the base body, wherein the cartridge cover is dismountably mounted on the base body so as for closing the opening of the battery cartridge, wherein the spacer body has a wiring channel, wherein the connection wire is kept in the wiring channel of the spacer body, wherein an end of the connection wire is connected with the battery cartridge, while the other end of the connection wire is connected with the circuit board.

According to one embodiment of the present invention, the lamp further includes a base and a connection wire, wherein the base comprises a base body, a rechargeable battery and a cartridge cover, wherein the base body is arranged on the lower portion of the lamp body, wherein the rechargeable battery is arranged inside of the base body, wherein the cartridge cover is mounted on the base body so as for holding the rechargeable battery between the base body and the cartridge cover, wherein the spacer body has a wiring channel, wherein the connection wire is kept in the wiring channel of the spacer body, wherein an end of the connection wire is connected with the rechargeable battery, while the other end of the connection wire is connected with the circuit board.

According to one embodiment of the present invention, the lamp further includes a battery cartridge, a cartridge cover and a connection wire, wherein the lamp body has a mounting space, wherein the mounting space is extended from the lower cover body to the spacer body, wherein the battery cartridge is arranged in the mounting space of the lamp body, wherein the cartridge cover is dismountably mounted on the lower cover body so as for closing the opening of the battery cartridge, wherein the spacer body has a wiring channel, wherein the connection wire is kept in the wiring channel, wherein an end of the connection wire is connected the battery cartridge, while the other end of the connection wire is connected with the circuit board.

According to one embodiment of the present invention, the lamp further includes a rechargeable battery and a cartridge cover, wherein the lamp body has a mounting space, wherein the mounting space is extended from the lower cover body to the spacer body, wherein the rechargeable battery is arranged in the mounting space of the lamp body, wherein the cartridge cover is mounted on the lower cover body so as for holding the rechargeable battery in the mounting space of the lamp body, wherein the spacer body has a wiring channel, wherein the connection wire is kept in the wiring channel of the spacer body, wherein an end of the connection wire is connected with the rechargeable battery, while the other end of the connection wire is connected with the circuit board.

According to one embodiment of the present invention, the lamp further comprises a carrying part, wherein the carrying part is arranged on the upper portion of the lamp body, so as to form, define, and provide a carrying space between the carrying part and the upper portion of the lamp body.

According to one embodiment of the present invention, the carrying part has a carrying groove, communicated with the carrying space.

According to one embodiment of the present invention, the carrying part has a carrying opening, arranged on a side of the carrying part and communicated with the carrying space.

According to another aspect of the present invention, the present invention further provides an assembling method of lamp, including the steps of:

(a) arranging a partition member having a lower cover body formed on the lower end thereon from an end of a side wall into an internal space of the side wall, so as to form and define at least two optical cavities between the side wall and the partition member and to utilize the lower cover body to close lower openings of the optical cavities when the partition member divides the internal space of the side wall; and (b) allowing a circuit board that closes upper openings of the optical cavities to hold at least an illumination part at upper ends of the optical cavities for assembling the lamp.

According to one embodiment of the present invention, the method further includes the steps of: electrically connecting an end of a connection wire to the circuit board before the step (b), and after the step (b), electrically connecting the other end of the connection wire to a battery cartridge and mounting a base body having the battery cartridge arranged thereon on the lower cover body.

According to one embodiment of the present invention, in the above method, the connection wire is allowed to enter and be kept in a wiring channel of a spacer body of the partition member.

According to one embodiment of the present invention, the assembling method further includes a step of: mounting an upper cover body that has a carrying body formed and provided thereon on an end of the side wall.

According to an embodiment of the present invention, the assembling method further includes the steps of: mounting an upper cover body on an end of the side wall, and mounting a carrying part on the upper cover body.

According to another aspect of the present invention, the present invention further provides a lamp, including:

a lamp body, having an upper portion, a lower portion and at least one optical cavity, wherein the upper portion is positioned higher than the lower portion, wherein the optical cavity is extended from the upper portion to the lower portion; and an insect repellent part, arranged in the optical cavity and adapted for repelling insects through illuminating.

According to one embodiment of the present invention, the quantity of the optical cavity is at least two, wherein each of the optical cavities has one the insect repellent part arranged therein, wherein the lamp has a surrounding lighting state and a side lighting state, wherein the lamp is operatable in switching between the surrounding lighting state and the side lighting state.

According to one embodiment of the present invention, the lamp further comprises at least one illumination part, wherein the illumination part is arranged in the optical cavity, wherein the lamp has a surrounding lighting state and a side lighting state, wherein the lamp is operatable in switching between the surrounding lighting state and the side lighting state.

According to one embodiment of the present invention, the lamp further includes at least one illumination part, wherein the illumination part is arranged in at least one optical cavity, wherein the insect repellent part is arranged in different the optical cavity.

According to one embodiment of the present invention, the lamp body comprises a photopermeable wall and an opaque dividing element, wherein the photopermeable wall has an accommodation chamber formed and defined therein, wherein the dividing element divides the accommodation chamber into at least two optical cavities.

According to one embodiment of the present invention, the dividing element comprises a spacer body and at least two spacer boards, wherein the spacer boards are interconnected through the spacer body, wherein the spacer boards are extended from the spacer body to the photopermeable wall, so as to form and define the optical cavities among the spacer boards, the photopermeable wall, and the spacer body.

According to one embodiment of the present invention, the sides of the spacer boards are attached on the photopermeable wall.

According to one embodiment of the present invention, the lamp body further includes a bottom cover, wherein the bottom cover is mounted on the lower end of the photopermeable wall and at least part of the bottom cover forms and provides a reflection wall, so as to utilize the reflection wall to reflect the light emitted by the insect repellent part to the photopermeable wall.

According to one embodiment of the present invention, the lamp further includes a circuit board, wherein the circuit board is mounted on the upper end of the photopermeable wall, and the insect repellent part is mounted on the circuit board in the manner of facing toward the bottom cover.

According to one embodiment of the present invention, the lamp further includes a circuit board, wherein the circuit board is mounted on the lower end of the photopermeable wall, and the insect repellent part is mounted on the circuit board, so as to utilize the circuit board to hold the insect repellent part on the lower end of the photopermeable wall.

According to one embodiment of the present invention, the lamp further includes a circuit board, wherein the circuit board divides one accommodation chamber formed and defined by the photopermeable wall into two of the accommodation chambers, wherein the insect repellent part is mounted on the circuit board.

According to one embodiment of the present invention, the lamp further includes a base, wherein the lamp body is supported on the base.

According to one embodiment of the present invention, the lamp further includes a power supplying part arranged on the base, and the power supplying part is electrically connected with the insect repellent part.

According to one embodiment of the present invention, the base comprises a base body and a battery cartridge body, wherein the battery cartridge body is supported on the base body, wherein the power supplying part is accommodated in a battery cartridge of the battery cartridge body.

According to one embodiment of the present invention, the lamp further comprises a carrying part, wherein the carrying part is arranged on the upper portion of the lamp body and is rotatably mounted on the upper portion, so as to form, define, and provide a carrying space between the carrying part and the lamp body.

According to one embodiment of the present invention, the lamp further includes a switch arranged on the base and the insect repellent part is controllably connected with the switch.

DETAILED DESCRIPTION OF THE PREFERRED EMBODIMENT

Figure 1:
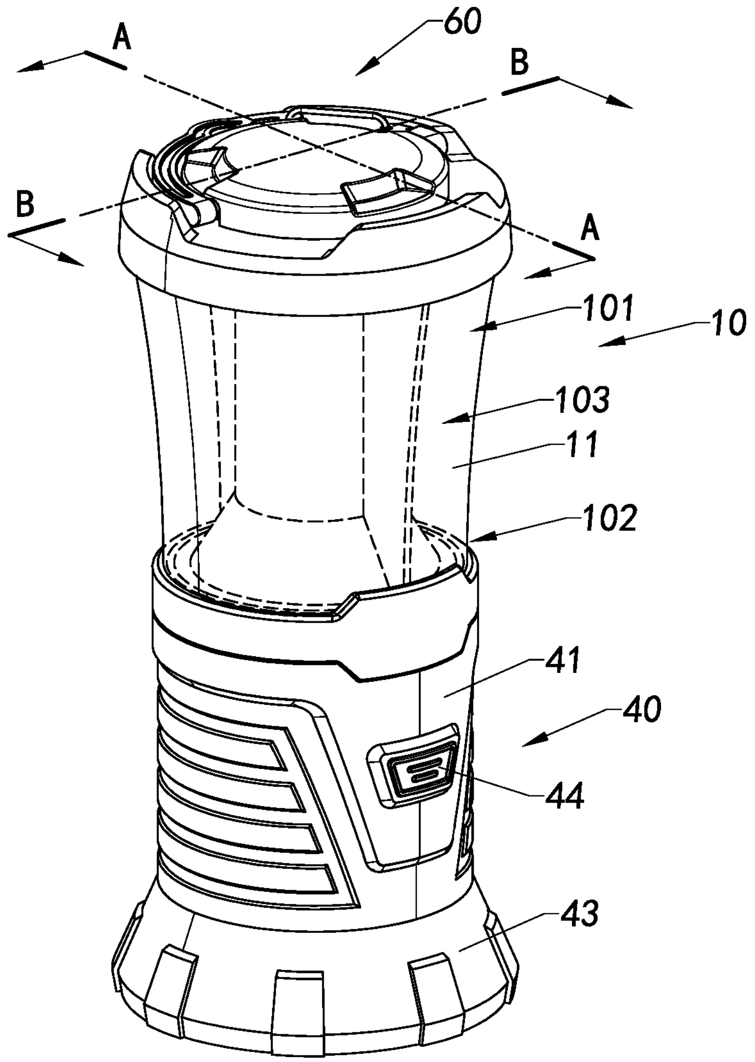
FIG. 1 is a perspective view of a lamp according to a first preferred embodiment of the present invention.
Figure 2:
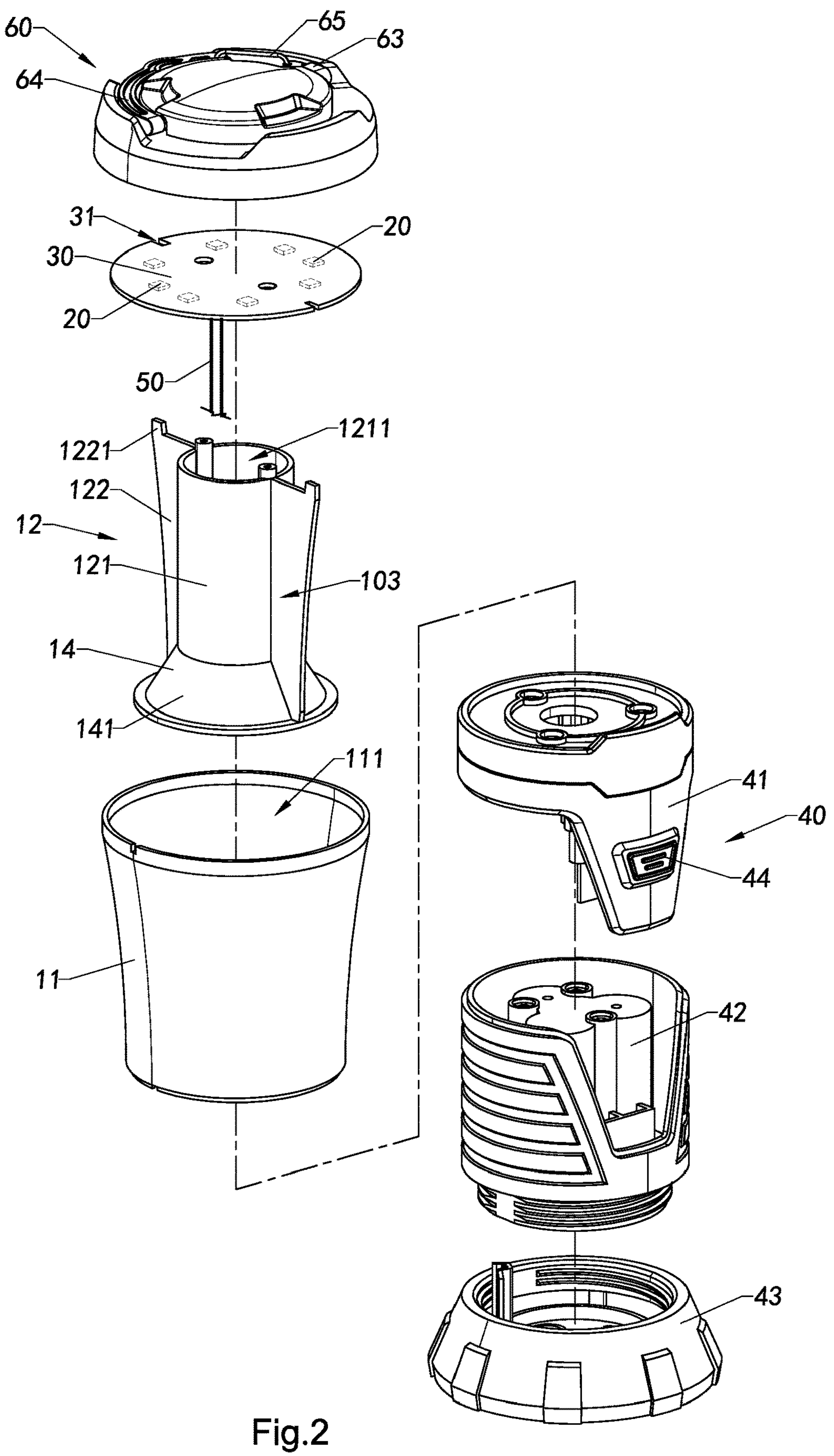
FIG. 2 is an exploded view of the lamp according to the above first preferred embodiment of the present invention.
Figure 3A:
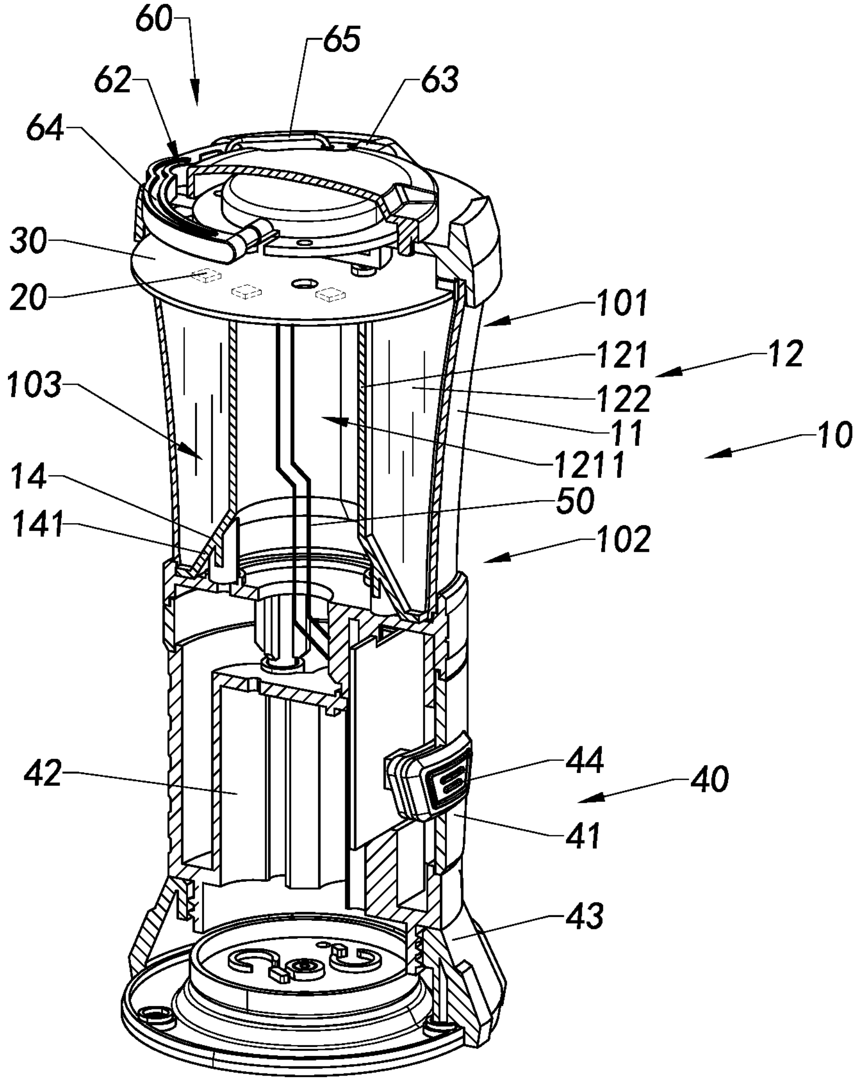
FIG. 3A is a sectional view of FIG. 1 being sectioned along the A-A line.
Figure 3B:
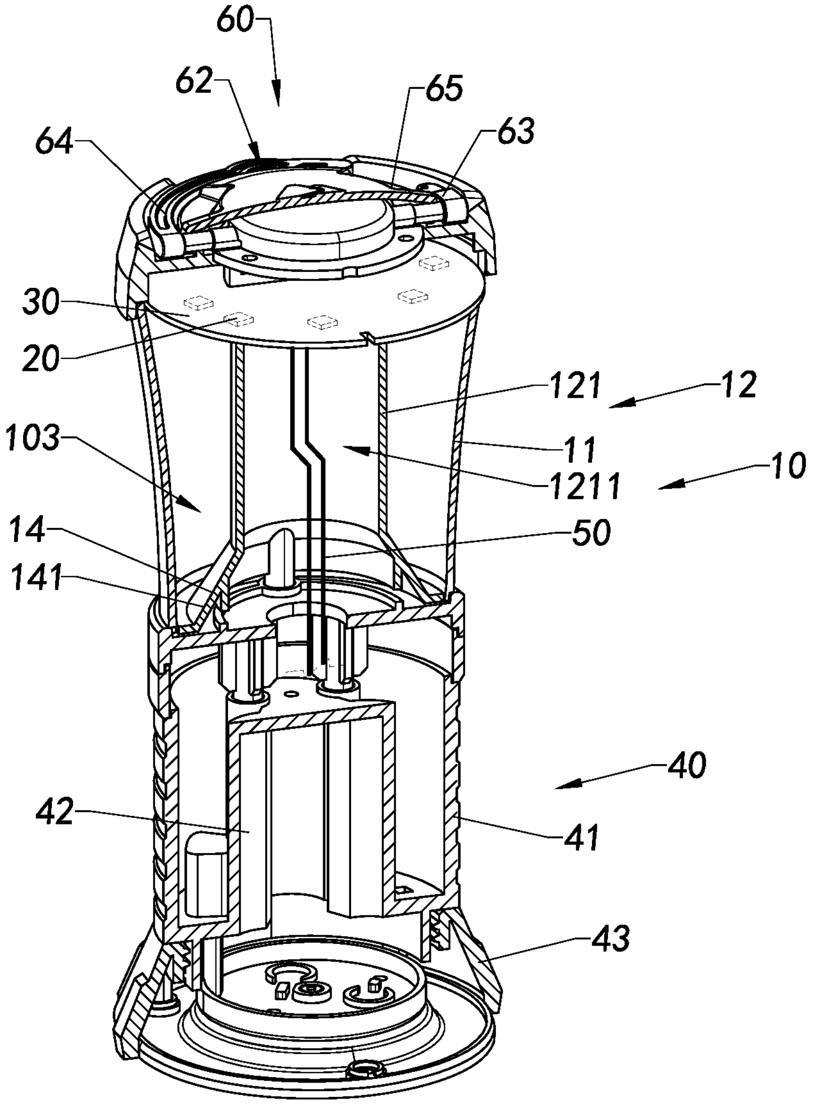
FIG. 3B is a sectional view of FIG. 1 being sectioned along the B-B line.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above-mentioned terminologies shall not be interpreted as confine to the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

Referring to FIGS. 1-3B, a lamp according to a first preferred embodiment of the present invention is disclosed and illustrated in the following description. The lamp has a surrounding lighting state and a side lighting state, wherein the lighting states of the lamp is configured to be switchable between the surrounding lighting state and the side lighting state, so as for the user to choose the lighting states of the lamp based on the needs. For example, when the lamp is utilized in camping, the lighting states of the lamp can be switched to the surrounding lighting state, such that the lamp can provide even and uniform light to the surrounding. When the lamp is utilized for illumination, the lighting states of the lamp can be switched into the side lighting state, such that the lamp only provides light to a specific direction.

Specifically, the lamp comprises a lamp body 10 and at least two illumination parts 20, wherein the lamp body 10 has an upper portion 101, a lower portion 102 corresponding to the upper portion 101, and at least two optical cavities 103 respectively extended between the upper portion 101 and the lower portion 102, wherein the illumination parts 20 are arranged in the optical cavities 103 respectively and adapted to independently illuminate in the optical cavities 103 respectively, so as to allow the lighting states of the lamp be controlled to switch between the surrounding lighting state and the side lighting state through controlling operating modes (e.g. if the illumination parts is lighted) of the illumination parts arranged in the optical cavities 103 respectively.

It is worth mentioning that the lamp body 10 of the lamp as illustrated in FIGS. 1-3B has two optical cavities 103, wherein each of the optical cavities 103 has at least one illumination part 20 provided therein. When the lamp is in the surrounding lighting state, the illumination parts 20 respectively arranged in the two optical cavities 103 of the lamp body 10 will both be powered and in an operating mode (the illumination parts 20 are lighted), so that the lamp 10 can provide light to the surrounding environment. Correspondingly, when the lamp is in the side lighting state, one of the illumination parts 20 in the respective optical cavity 103 of the lamp body 10 is powered and in a lighting state, while the illumination part 20 in the other optical cavity 103 of the lamp body 10 is not powered and is in an off state (the illumination part 20 is not lighted), so that the lamp body 10 is able to provide light toward a specific direction only. Preferably, the illumination widths of the two optical cavities 103 of the lamp body 10 are consistent. Optionally, the illumination widths of the two optical cavities 103 of the lamp body 10 are different, so that the specific mode of the lamp in the side lighting state can be selected. For instance, when the illumination part 20 in the optical cavity 103 having a wider illumination width of lamp body 10 are powered and in an operating mode, the lighting width of the lamp will be larger. Correspondingly, when the illumination part 20 in the optical cavity 103 having a smaller illumination width of the lamp body 10 is powered and in an operating mode, the lighting width of the lamp will be smaller.

It is worth mentioning that the arrangement of the lamp body 10 of the lamp, as illustrated in FIGS. 1-3B, has two optical cavities 103, simply as an example to aid the description and understanding of the lamp of the present invention rather than to limit the content and scope of the lamp of the present invention. For example, for the lamp according to other embodiments of the present invention, the quantity of the optical cavity 103 of the lamp body 10 may be three or more.

Referring to FIG. 1-3B, the lamp body 10 comprises a photopermeable surrounding wall 11 and a partition member 12, wherein the surrounding wall 11 has an accommodation space 111, wherein the partition member 12 is arranged in the accommodation space 111 of the surrounding wall 11, so as to utilize the partition member 12 to divide the accommodation space 111 of the surrounding wall 11 and to form and define at least two optical cavities 103 and to utilize the surrounding wall 11 to form and construct the exterior of the lamp body 10.

Preferably, the surrounding wall 11 is a circular surrounding wall, that is a circular cross section of the surrounding wall 11 defining a circular shape such that when the lamp is in the surrounding lighting state, the light generated by each of the illumination parts 20 in the optical cavities 103 can pass through the surrounding wall 11 to evenly and uniformly provide light to the surrounding all around. Optionally, the surrounding wall 11 may also be an oval shaped side wall, a polygonal shaped side wall, and etc.

Preferably, the partition member 12 of the lamp body 10 is an opaque partition member, so that the partition member 12 only allows the light generated by the illumination part 20 in one of the optical cavities 103 radiating to the outside through the surrounding wall 11 that forms the optical cavity 103 and prevent the light generated by the illumination part 20 in the other optical cavity 103 from passing through the partition member 12 and entering the other optical cavity 103.

The partition member 12 further comprises a spacer body 121 and at least two spacer boards 122, wherein the spacer body 121 is kept in the accommodation space 111 of the surrounding wall 11, wherein the spacer boards 122 are respectively extended between an outer wall of the spacer body 121 and an inner wall of the surrounding wall 11 in a spaced manner with respect to each other, and that the two ends of each of the spacer boards 122 and the spacer body 121 are respectively extended to the upper portion 101 and the lower portion 102 of the lamp body 10, so as to form and define the one or more optical cavities 103 between the surrounding wall 11 and the spacer body 121 and the adjacent spacer boards 122.

Preferably, referring to the lamp according to the preferred embodiment as illustrated in FIGS. 1-3B, each of the spacer boards 122 is respectively and integrally formed on the outer wall of the spacer body 121, wherein an outer edge of each of the spacer boards 122 is extended to and attached on the inner wall of the surrounding wall 11. The radian of the outer edges of the spacer boards 122 of the partition member 12 is consistent to the radian of the inner wall of the surrounding wall 11, so as to have the outer edges of the spacer boards 122 being closely attached on the inner wall of the surrounding wall 11. Therefore, when the illumination part 20 arranged in one of the two optical cavities 103 generates light, the spacer body 121 and the spacer boards 122 of the partition member 12 can block the light from entering the other one of the two optical cavities 103.

Optionally, for the lamp according to another preferred embodiment of the present invention, each of the spacer boards 122 is integrally formed on the inner wall of the surrounding wall 11, wherein the inner side of each of the spacer boards 122 is extended to and attached on the outer wall of the spacer body 121. The radian of the inner side wall of the spacer boards 122 of the partition member 12 is consistent to the radian of the outer wall of the spacer body 121, so as to have the inner side wall of the spacer boards 122 being closely attached on the outer wall of the spacer body 121. Therefore, when the illumination part 20 arranged in one of the optical cavities 103 generates light, the spacer body 121 and the spacer boards 122 of the partition member 12 can block the light from entering the other one of the optical cavities 103.

Optionally, for the lamp according to another preferred embodiment of the present invention, the spacer body 121, the spacer boards 122, and the surrounding wall 11 are independent to one another, so that the outer sides and the inner sides of the spacer boards 122 are respectively extended so as to have the outer edges of the two sides of the spacer boards 122 respectively being closely attached on the inner wall of the surrounding wall 11 and the outer wall of the spacer body 121. Therefore, when the illumination part 20 arranged in one of the optical cavities 103 generates light, the spacer body 121 and the spacer boards 122 of the partition member 12 can block the light from entering the other optical cavity 103. More specifically, the spacer body 121 has at least a locating groove and the surrounding wall 11 also has at least a locating groove, wherein the spacer boards 122 is extended between the spacer body 121 and the surrounding wall 11 in the manner that the inner side and the outer side of the spacer boards 122 are respectively positioned in the locating groove of the spacer body 121 and the locating groove of the surrounding wall 11.

Preferably, the spacer body 121 of the partition member 12 is retained in a middle portion of the accommodation space 111 of the surrounding wall 11, wherein the circular shape defined by the circular cross section of the spacer body 121 and the circular shape defined by the circular cross section of the surrounding wall 11 are concentric circles, such that when the lamp is in the surrounding lighting state, the lamp is able to provide even and uniform light to the surrounding.

It is understandable that, by extending the spacer boards 122 between the spacer body 121 and the surrounding wall 11, the lamp reinforces the strength of the surrounding wall 11 of the lamp through the spacer boards 122 that avoids the surrounding wall 11 from undesirable tendencies like distortion.

Referring to FIGS. 1-3B, the lamp body 10 further comprises an upper cover body 13 and a lower cover body 14, wherein the upper cover body 13 is arranged on the upper portion 101 of the lamp body 10, so as for closing the upper openings of the optical cavities 103. Correspondingly, the lower cover body 14 is arranged on the lower portion 102 of the lamp body 10 for closing the lower openings of the optical cavities 103, so that each of the optical cavities 103 respectively becomes a closed chamber. Preferably, the partition member 12 and the lower cover body 14 are integrally formed, so that when the partition member 12 is arranged in the accommodation space 111 of the surrounding wall 11 to form and define the optical cavities 103 between the partition member 12 and the surrounding wall 11, the lower cover body 14 closes the lower openings of the optical cavities 103. Optionally, the surrounding wall 11 and the upper cover body 13 are integrally formed, so that when the partition member 12 is arranged in the accommodation space 111 of the surrounding wall 11 to form and define the optical cavities 103 between the partition member 12 and the surrounding wall 11, the upper cover body 13 closes the upper openings of the optical cavities 103.

Further, referring to FIGS. 1-3B, the lamp comprises a circuit board 30, wherein the illumination parts 20 are arranged on the circuit board 30, wherein the circuit board 30 is arranged on the upper portion 101 of the lamp body 10 in such a manner that the circuit board 30 closes the upper opening of the optical cavities 103. Besides, the circuit board 30 allows the illumination parts 20 to be respectively arranged in the optical cavities by being held in the optical cavities 103, so that the lights generated by the illumination parts 20 can pass through the surrounding wall 11 and radiate to the outside of the lamp. When assembling the lamp, after the circuit board 30 is arranged on the upper portion 101 of the lamp body 10, the upper cover body 13 is mounted on the lamp body 10, so as to prevent the circuit board 30 from being revealed and exposed. Preferably, the illumination parts 20 may be LED luminous elements or LED luminous component units being attached and mounted on the circuit board 30.

Preferably, at least one of the spacer boards 122 of the partition member 12 is extended upwardly to form a positioning bulge 1221. Correspondingly, the circuit board 30 has at least a positioning notch 31. When the circuit board 30 is arranged on the upper portion 101 of the lamp body 10, the positioning bulge 1221 of the spacer boards 122 is kept in the positioning notch 31 of the circuit board 30, so as to ensure the illumination parts 20 arranged on the circuit board 30 to be positioned and arranged at the upper ends of the optical cavities 103 respectively for arranging the illumination parts 20 in the optical cavities 103 respectively, that avoids dislocations of the illumination parts 20 and the optical cavities 103. In other words, the lamp of the present invention ensures the mounting position and the mounting angle of the circuit board 30 through having the positioning bulge 1221 of the spacer boards 122 be positioned at the positioning notch 31 of the circuit board 30.

In other words, for the lamp according to this embodiment of the present invention, the illumination parts 20 are held on the upper ends of the optical cavities 103 of the lamp body 10, so as to allow the illumination parts to generate light on the upper ends of the optical cavities 103 of the lamp body 10. Preferably, both the outer wall of the spacer body 121 of the partition member 12 and the outer sides of the spacer boards 122 have a reflection layer for reflecting the light generated by the illumination parts 20, so as to allow the light generated by the illumination parts 20 to effectively pass through the surrounding wall 11 and radiate to the outside. More Preferably, the lower cover body 14 has a conical oblique inner wall 141 obliquely extended from the spacer body 121 towards an edge direction of the lower cover body 14 downwardly and outwardly, wherein the illumination parts 20 face toward the oblique inner wall 141 of the lower cover body 14, so as to reflect the light generated by the illumination parts 20 by the oblique inner wall 141 of the lower cover body 14, so as to further allow the light generated by the illumination parts 20 to be reflected to effectively pass through the surrounding wall 11 and radiate to the outside.

Optionally, for the lamp according to other embodiment of the present invention, the circuit board 30 is arranged on the lower portion 102 of the lamp body 10 in a manner that the circuit board 30 closes the lower openings of the optical cavities 103, so as to held the illumination parts 20 on the lower ends of the optical cavities 103, so as to allow the illumination parts 20 to produce light on the lower portion of the optical cavities 103. Preferably, according to this embodiment, the upper cover body 13 has an oblique inner wall obliquely extended from the spacer body 121 toward the edge direction of the upper cover body 13, wherein the illumination parts 20 face toward the oblique inner wall of the upper cover body 13, so as to reflect the light generated by the illumination parts 20 through the oblique inner wall of the upper cover body 13, so as to further allow the light generated by the illumination parts 20 to effectively pass through the surrounding wall 11 and radiate to the outside.

Referring to FIGS. 1-3B, the lamp comprises a base 40, arranged on the lower portion 102 of the lamp body 10, wherein the base 40 is for maintaining the lamp on a bearing surface 100, as shown in FIG. 4. In other words, the base 40 allows the lamp to be placed on the bearing surface 100 and utilized thereby.

Further, the base 40 comprises a base body 41, a battery cartridge 42 and a cartridge cover 43. The base body 41 is arranged on the lower portion 102 of the lamp body 10. The battery cartridge 42 is arranged inside the base body 41 so as for one or more batteries (e.g. dry cell battery, rechargeable battery, and etc.) to be installed therein. The cartridge cover 43 is mounted on the base body 41 for closing the opening of the battery cartridge 42. Preferably, the cartridge cover 43 is detachably mounted on the base body 41, so as to allow the user to detach the cartridge cover 43 from the base body 41 to access and expose an opening of the battery cartridge 42. In this way, the lamp is allowed to replace the one or more batteries installed in the battery cartridge 42.

It is worth mentioning that the battery cartridge 42 of the lamp, as shown in FIGS. 1-3B, is a dry cell battery cartridge for installing dry cell batteries, rechargeable batteries, and etc. Nevertheless, this is merely to give examples to aid the description and understanding of the lamp of the present invention, rather than to limit the content and scope of the lamp of the present invention. For example, for lamp according to other embodiments of the present invention, at least a rechargeable battery (e.g. lithium battery and etc.) can be affixedly mounted in the battery cartridge 42. Then the cartridge cover 43 can be affixed on the base body 41 through, but not limited to, latching, screwing and locking, so as to prevent the user from accidently remove the at least one rechargeable battery from the base 40. Certainly, it is understandable that, in this embodiment, the base may have a charging port arranged on the base body 41 or on the cartridge cover 43 and electrically linked to the at least one rechargeable battery for charging the at least one rechargeable battery through the charging port by the user.

Preferably, the bottom 40 further comprises a switch 44, wherein the switch 44 is arranged on the base body 41 so as for controlling the power supplying mode of the battery to the circuit board 30 through the switch 44. For example, the lamp further comprises a set of one or more connection wire 50, wherein the one or more connection wires 50 can be extended from the switch 44 and the battery cartridge 42 of the base 40 to the circuit board 30, so as for controlling the power supplying mode of the battery to the circuit board 30 through the switch 44. Preferably, the spacer body 121 of the partition member 12 has a wiring channel 1211 arranged thereon, wherein the connection wire 50 is kept in the wiring channel 1211 of the spacer body 121, so as to prevent the one or more connection wires 50 from affecting the illumination effect of the lamp and to conceal the one or more connection wires 50.

Preferably, the base 40 is a cylindrical shaped base. The shape and size of the base 40 matches with the shape and size of the lamp body 10, so as to enhance the aesthetics of the lamp.

Figure 4A:
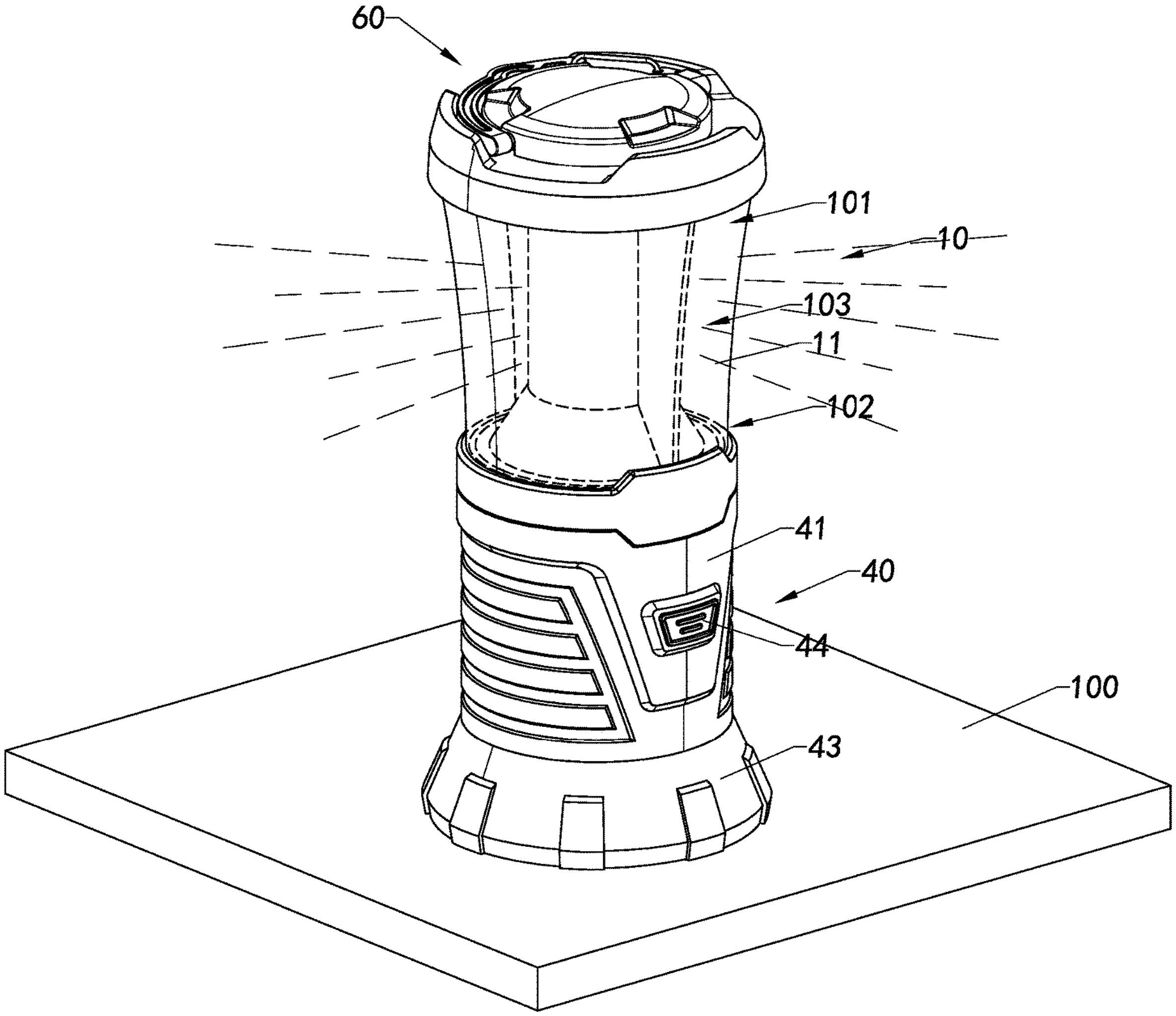
FIG. 4A is a perspective view illustrating a first service mode of the lamp according to the above first preferred embodiment of the present invention.
Figure 4B:
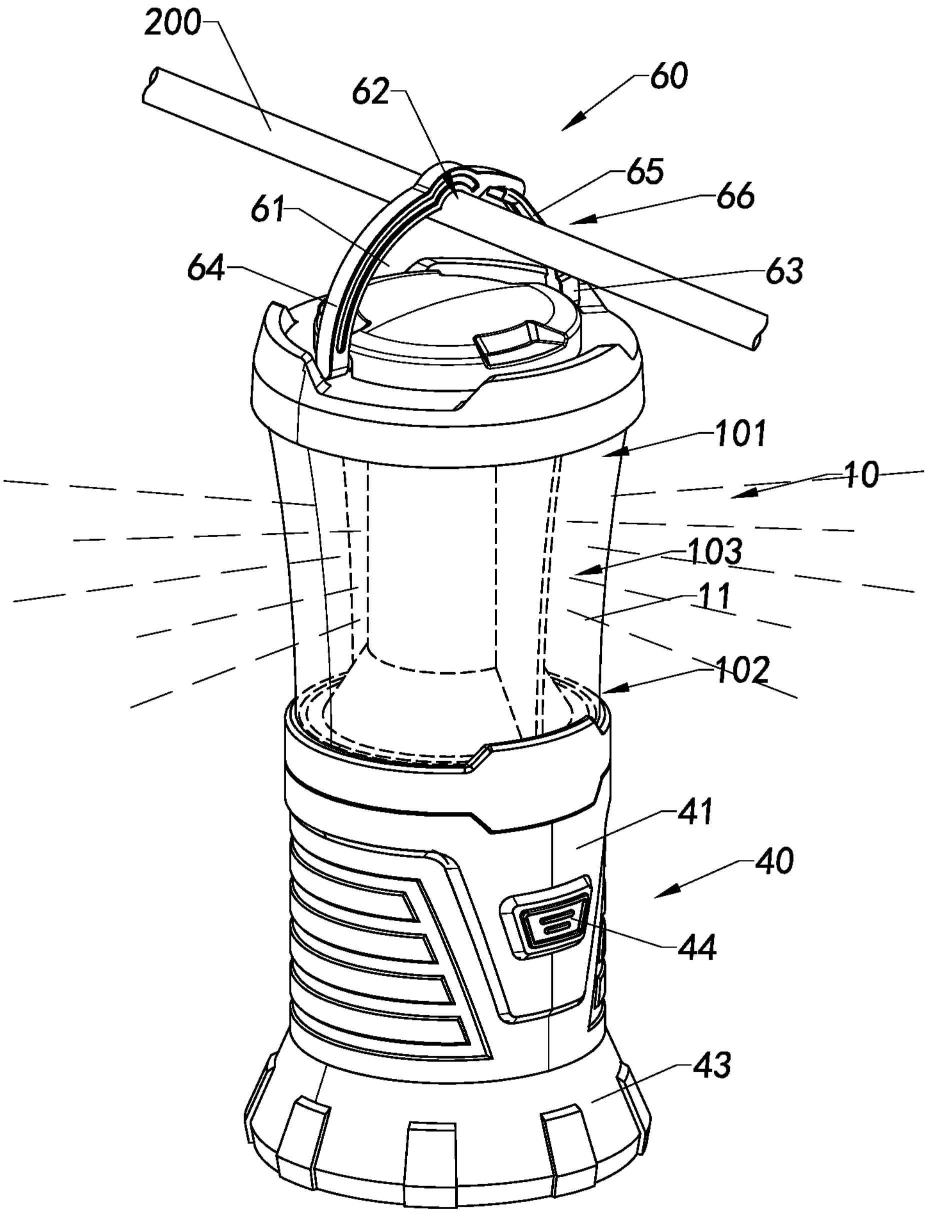
FIG. 4B is a perspective view illustrating a second service mode of the lamp according to the above first preferred embodiment of the present invention.

Referring to FIGS. 1-3B, the lamp further comprises a carrying part 60, wherein the carrying part 60 is arranged on the upper portion 101 of the lamp body 10, so as to form, define and provide a carrying space 61 between the carrying part 60 and the upper cover body 13 of the lamp body 10 in order for allowing the lamp to be utilized in a carried manner. For instance, the user may move the lamp along with his/her movement through putting his/her finger into the carrying space 61 to carry the lamp through the carrying part 60 or the user may insert a carrying body 200 into the carrying space 61 to hang the lamp on the carrying body 200, as illustrated in FIG. 4B.

Preferably, the carrying part 60 has a carrying groove 62, wherein the carrying groove 62 is communicated with the carrying space 61, wherein the lamp allows the carrying body to be kept in the carrying groove 62 of the carrying part 60, so as to avoid slide from occurring between the lamp and the carrying body 200 which renders rocking and inclination of the lamp. More preferably, the carrying groove 62 is arranged on a middle part of the carrying part 60, so that when the lamp allows the carrying body 200 to be retained in the carrying groove 62 of the carrying part 60, the lamp body 10 can stay vertically downward. In this way, it prevents the lamp from being oblique and inclined, so as to allow the lamp to provide even and uniform light to the surrounding.

Preferably, the carrying part 60 is rotatably mounted on the upper cover body 13 of the lamp body 10, so as to allow the carrying part 60 to be folded and overlapped on the upper cover body 13 of the lamp body 10 when the lamp or the carrying part 60 of the lamp is not in use, which can reduce the volume of the lamp. Optionally, the carrying part 60 and the upper cover body 13 of the lamp body 10 are integrally formed.

Furthermore, the carrying part 60 comprises a first carrying arm 63, a second carrying arm 64 and a locking member 65, wherein the mounting end of the first carrying arm 63 and the mounting end of the second carrying arm 64 are corresponding to each other and are rotatably mounted on two opposite sides of the upper cover body 13 of the lamp body 10 respectively, so as to correspond the free end of the first carrying arm 63 and the free end of the second carrying arm 64 on the sides of the carrying part 60. The free end of the first carrying arm 63 and the free end of the second carrying arm 64 jointly provide a carrying opening 66 therebetween. An end of the locking member 65 is rotatably mounted on the free end of the first carrying arm 63, while the other end of the locking member 65 is detachably connected with the free end of the second carrying arm 64, so as to allow the locking member 65 to open and close the carrying opening 66. It is understandable that the carrying groove 62 is formed in the second carrying arm 64.

For the lamp of this embodiment, as illustrated in FIGS. 1-3B, the carrying opening 66 of the carrying part 60 is formed and defined on the side of the carrying part 60, so as for the user to hang the lamp on the carrying body 200 through hand-holding the lamp body 10 and/or the base 40 of the lamp. Specifically, the user hand-holds the lamp body 10 and/or the base 40. The locking member 65 is allowed to align to the carrying body 200. When pushing the lamp toward the carrying body 200 and having the carrying body 200 pressing the locking member 65, the carrying body 200 drives an end of the locking member 65 to be separated from the free end of the second carrying arm 64 and open the carrying opening 66 and to distort the torsion spring held between the locking member 65 and the first carrying arm 63. After the carrying body 200 enters the carrying space 61 of the carrying part 60, the end of the locking member 65 automatically swing to and be connected to the free end of the second carrying arm 64 under the function of the torsion spring held between the locking member 65 and the first carrying arm 63, so as for hanging the lamp on the carrying body 200, as illustrated in FIG. 4A. Preferably, the carrying body 200 to be kept in the carrying groove 62 of the carrying part 60, so as to avoid slide from occurring between the lamp and the carrying body 200 that causes rocking and inclination of the lamp.

Figure 4C:
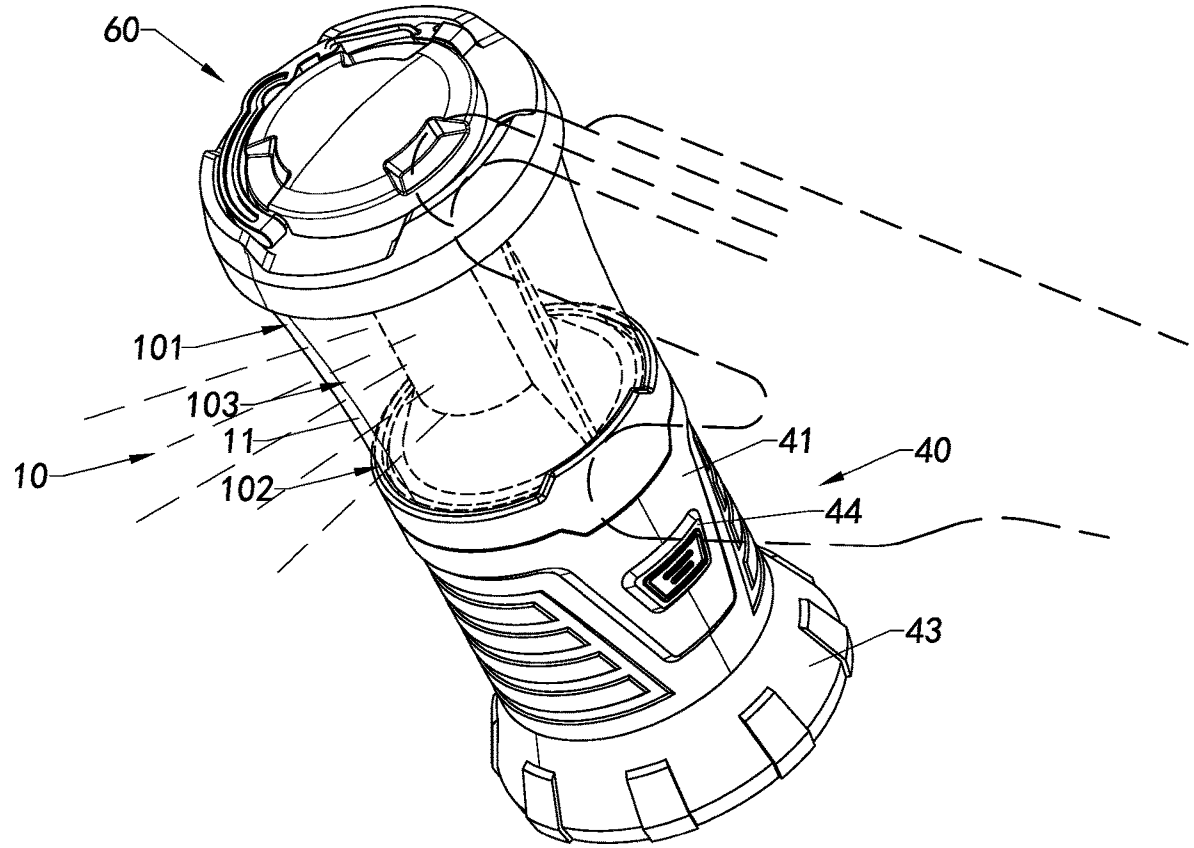
FIG. 4C is a perspective view illustrating a third service mode of the lamp according to the above first preferred embodiment of the present invention.
Figure 5:
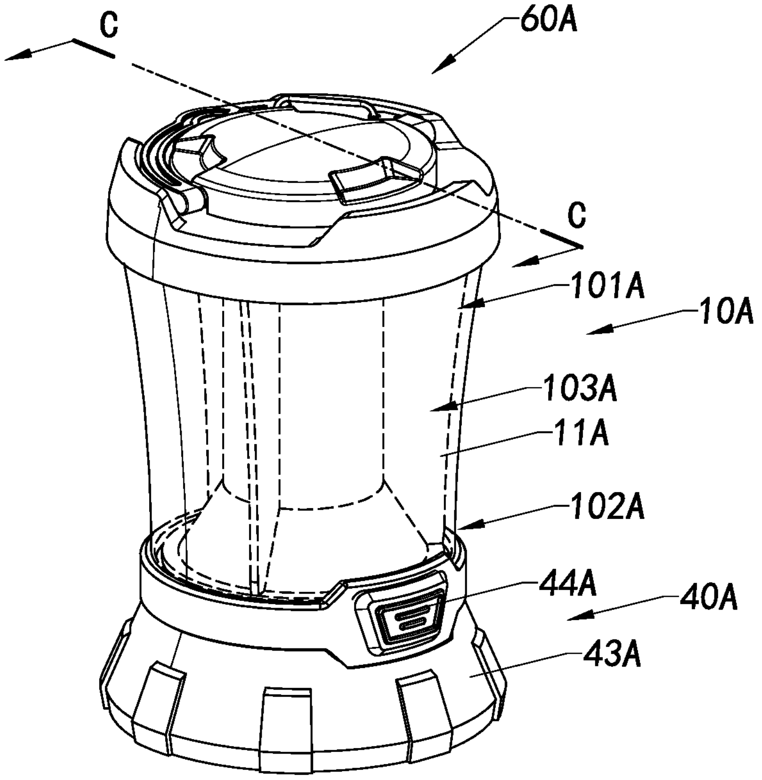
FIG. 5 is a perspective view of a lamp according to a second preferred embodiment of the present invention.
Figure 6:
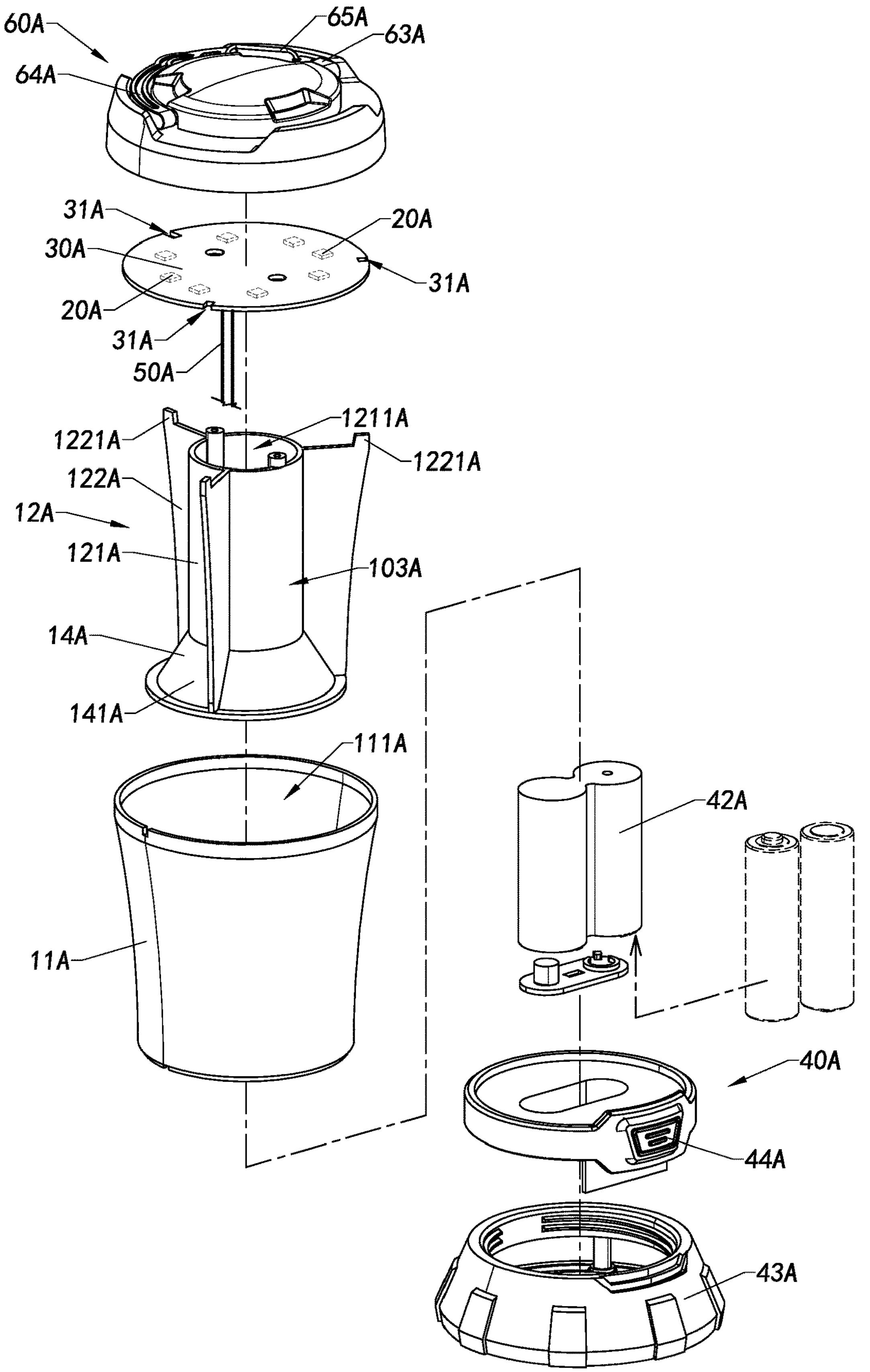
FIG. 6 is an exploded view of the lamp according to the above second preferred embodiment of the present invention.
Figure 7:
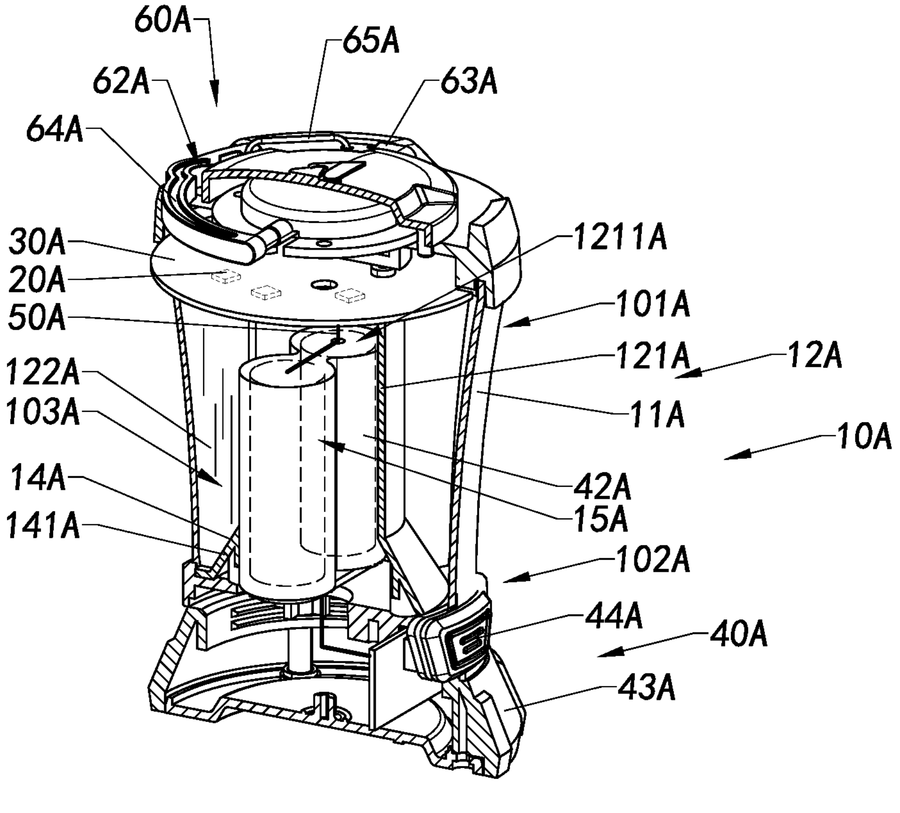
FIG. 7A is a sectional view of FIG. 5 being sectioned along the C-C line.
FIG. 7B is a sectional view of FIG. 5 being sectioned along the D-D line.

In addition, in the service modes, as illustrated in FIGS. 4A and 4B, the lamp is in the surrounding lighting state, so as to allow each of the optical cavities 103 of the lamp to radiate light outwards and to provide even and uniform light to the surroundings all around the lamp. In the application mode as illustrated in FIG. 4C, the lamp is in the side lighting state, wherein portion of the corresponding optical cavity 103 of the lamp can radiate light outward and the lamp can provide light to a specific direction.

According to another aspect of the present invention, the present invention further provides an assembling method of the lamp, including the steps of:

(a) arranging the partition member 12 having the lower cover body 14 formed on the lower end thereon from an end of the surrounding wall 11 into the internal space 111 of the surrounding wall 11, so as to form and define at least two of the optical cavities 103 between the surrounding wall 11 and the partition member 12 and to utilize the lower cover body 14 to close the lower openings of the optical cavities 103 when the partition member 12 divides the internal space 111 of the surrounding wall 11; and (b) allowing the circuit board 30 that closes the upper openings of the optical cavities 103 and holds at least one of the illumination parts 20 at the upper ends of the optical cavities 103 for assembling the lamp.

Preferably, the method further comprises the steps of, before the step (b), electrically connecting one end of the set of one or more connection wires 50 to the circuit board 30 and, after the step (b), electrically connecting the other end of the set of one or more connection wires 50 to the battery cartridge 42 and mounting the base body 41 having the battery cartridge 42 arranged thereon on the lower cover body 13.

Referring to FIGS. 5-7B, a lamp according to a second preferred embodiment of the present invention is disclosed and illustrated in the following description. The lamp has a surrounding lighting state and a side lighting state, wherein such lighting states of the lamp are arranged to be switchable between the surrounding lighting state and the side lighting state, so as for the user to choose the lighting states of the lamp according to the needs thereof. For example, when the lamp is utilized in camping, the lighting states of the lamp can be switched to the surrounding lighting state, such that the lamp can provide even and uniform light all around to the surroundings. When the lamp is utilized for illumination, the lighting states of the lamp can be switched to the side lighting state, such that the lamp only provides light to a specific direction.

Specifically, the lamp comprises a lamp body 10A and at least two illumination parts 20A. In which, the lamp body 10A has an upper portion 101A, a lower portion 102A and at least two optical cavities 103A. The upper portion 101A and the lower portion 102A of the lamp body 10A are corresponding to each other. The optical cavities 103A are respectively extended from the upper portion 101A of the lamp body 10A toward the direction of the lower portion 102A. Preferably, the optical cavities 103A are respectively extended from the upper portion 101A of the lamp body 10A to the lower portion 102A. Each of the optical cavities 103A of the lamp body 10A has at least one of the illumination parts 20A arranged therein, such that the lighting states of the lamp can be controlled to switch between the surrounding lighting state and the side lighting state through controlling the operating modes of each of the illumination parts arranged in the optical cavities 103A of the lamp body 10A.

Preferably, each of the optical cavities 103A of the lamp body 10A has one of the illumination parts 20A arranged therein. Optionally, each of the optical cavities 103A of the lamp body 10A has two or more of the illumination parts arranged therein, so as to allow the intensity of the light generated by each of the optical cavities 103A to be adjusted through controlling the quantity of the illumination parts 20A of each of the optical cavities 103A of the lamp body 10A.

Referring to FIG. 5-7B, the lamp body 10A comprises a photopermeable surrounding wall 11A and a partition member 12A, wherein the surrounding wall 11A has an accommodation space 111A, wherein the partition member 12A is arranged in the accommodation space 111A of the surrounding wall 11A, so as to utilize the partition member 12A to divide the accommodation space 111A of the surrounding wall 11A and to form and define at least two optical cavities 103A. For instance, for the lamp according to this specific embodiment, as illustrated in FIGS. 5-7B, the partition member 12A divides the accommodation space 111A of the surrounding wall 11A to form and define three optical cavities 103A.

Preferably, the surrounding wall 11A is a circular surrounding wall, that is the surrounding wall 11A has a circular cross section defining a circular shape such that when the lamp is in the surrounding lighting state, the light generated by each of the illumination parts 20A in the optical cavities 103A passes through the surrounding wall 11*a* to evenly and uniformly provide light to the surroundings. Optionally, the surrounding wall 11A may also be an oval shaped side wall, a polygonal shaped side wall, and etc. Preferably, the partition member 12A of the lamp body 10A is an opaque partition member, so that the partition member 12A only allow the light generated by the illumination part 20A in one of the optical cavities 103A to radiate to the outside through the surrounding wall 11A that forms the optical cavity 103A and prevent the light generated by the illumination part 20A in the other of the optical cavities from passing through the partition member 12A and entering the other optical cavity 103A.

The partition member 12A further comprises a spacer body 121A and at least two spacer boards 122A, wherein the spacer body 121A is retained in the accommodation space 111A of the surrounding wall 11A, wherein the spacer boards 122A are respectively extended between an outer wall of the spacer body 121A and the inner wall of the surrounding wall 11A in a spaced manner with respect to each other, and that the two ends of each of the spacer boards 122A and the spacer body 121A are respectively extended to the upper portion 101A and the lower portion 102A of the lamp body 10A, so as to form and define the one or more optical cavities 103A between the surrounding wall 11A and the spacer body 121A and the adjacent spacer boards 122A.

Preferably, referring to the lamp according to the preferred embodiment as illustrated in FIGS. 5-7B, each of the spacer boards 122A is integrally formed on the outer wall of the spacer body 121A, wherein an outer edge of each of the spacer boards 122A is extended to and attached on the inner wall of the surrounding wall 11A. The radian of the outer edges of the spacer boards 122A of the partition member 12A is consistent to the radian of the inner wall of the surrounding wall 11A, so as to have the outer edges of the spacer boards 122A be closely attached on the inner wall of the surrounding wall 11A. Therefore, when the illumination part 20A arranged in one of the optical cavities 103A generates light, the spacer body 121A and the spacer boards 122A of the partition member 12A can block the light from entering the other of the optical cavities 103A.

Preferably, the spacer body 121A of the partition member 12A is retained in the middle portion of the accommodation space 111A of the surrounding wall 11A, that is the circular shape defined by the circular cross section of the spacer body 121A and the circular shape defined by the circular cross section of the surrounding wall 11A are concentric circles, such that when the lamp is in the surrounding lighting state, the lamp is able to provide even and uniform light to the surroundings.

It is appreciated that, by extending the spacer boards 122A between the spacer body 121A and the surrounding wall 11A, the strength of the surrounding wall 11A of the lamp is reinforced through the spacer boards 122A that avoids the surrounding wall 11A from undesirable tendencies like distortion.

Further, referring to FIGS. 5-7B, the lamp comprises a circuit board 30A, wherein each of the illumination parts 20A is arranged on the circuit board 30A, wherein the circuit board 30A is arranged on the upper portion 101A of the lamp body 10A in such a manner that the circuit board 30A closes upper openings of the optical cavities 103A. Besides, the circuit board 30A enables the illumination parts 20A to be arranged in the optical cavities by being held in the optical cavities 103A, so that the light generated by the illumination parts 20A can pass through the surrounding wall 11A and radiate to the outside of the lamp. Preferably, each of the illumination parts 20A may be a LED luminous element or LED luminous component unit being attached and mounted on the circuit board 30A.

Preferably, at least one of the spacer boards 122A of the partition member 12A is extended upwardly to form a positioning bulge 1221A. Correspondingly, the circuit board 30A has at least a peripheral positioning notch 31A, such that when the circuit board 30A is arranged on the upper portion 101A of the lamp body 10A, the at least one positioning bulge 1221A of the spacer boards 122A is fittingly retained in the positioning notch 31A of the circuit board 30A, so as to ensure the illumination parts 20A arranged on the circuit board 30A to be positioned and arranged at the upper ends of the optical cavities 103A respectively for arranging the illumination parts 20A in the optical cavities 103A respectively, that avoids dislocations of the illumination parts 20A with respect to the optical cavities 103A.

Further, the lamp body 10A comprises an upper cover body 13A, arranged on the upper portion 101A of the lamp body 10A, so as to prevent the circuit board 30A from being revealed and exposed so that the circuit board 30A is protected by the upper cover body 13. Preferably, the upper cover body 13A has one or more female screw threads while the surrounding wall 11A has one or more male screw threads, so as to allow the upper cover body 13A to be arranged on the upper portion 101A of the lamp body 10A through coordinating and engaging the one or more female screw threads of the upper cover body 13A and the one or more male screw threads of the surrounding wall 11A.

Further, the lamp body 10A comprises a lower cover body 14A, arranged on the lower portion 102A of the lamp body 10A so as for closing the lower openings of the optical cavities 103A and thus rendering the optical cavities 103A as closed chambers. Preferably, the partition member 12A and the lower cover body 14A are integrally formed, so that when the partition member 12A is arranged in the accommodation space 111A of the surrounding wall 11A to form and define the optical cavities 103A between the surrounding wall 11A and the partition member 12A, the lower cover body 14A closes the lower openings of the optical cavities 103A.

Preferably, each of the outer wall of the spacer body 121A of the partition member 12A and the outer walls of the spacer boards 122A has a reflection layer for reflecting the light generated by the respective illumination parts 20A, so as to allow the light generated by the illumination parts 20A to effectively pass through the surrounding wall 11A and radiate to the outside. More Preferably, the lower cover body 14A has a conical oblique inner wall 141A obliquely extended from the spacer body 121A towards an edge direction of the lower cover body 14A downwardly and outwardly, wherein the illumination parts 20A face towards the oblique inner wall 141A of the lower cover body 14A, so as to reflect the light generated by the illumination parts 20A by the oblique inner wall 141A of the lower cover body 14A, so as to further allow the light generated by the illumination parts 20A to be reflected to effectively pass through the surrounding wall 11A and radiate to the outside.

Further, the lamp body 10A has a mounting space 15A, extended from the lower cover body 14A to the spacer body 121A of the partition member 12A. The lamp further comprises a battery cartridge 42A and a cartridge cover 43A, wherein the battery cartridge 42A is arranged in the mounting space 15A of the lamp body 10A and the battery cartridge 42A is utilized for having one or more batteries (e.g. dry cell battery, rechargeable battery, and etc.) be installed therein. The cartridge cover 43A is detachably mounted on the lower cover body 14A, so as to allow the user to detach the cartridge cover 43A from the lower cover body 14A to access and expose an opening of the battery cartridge 42A. In this way, the lamp is allowed to replace the one or more batteries installed in the battery cartridge 42A. Optionally, a rechargeable battery (e.g. lithium battery and etc.) can be securely mounted in the battery cartridge 42A. Then the cartridge cover 43A can be affixed to the lower cover body 14A through, but not limited to, latching, screwing and locking, so as to prevent the user from accidently removing the rechargeable battery from the lower cover body 14A. Certainly, it is understandable that, in this embodiment, the lower cover body 14A may have a charge port arranged on the lower cover body 14A or on the cartridge cover 43A and electrically linked to the one or more rechargeable batteries for charging the one or more rechargeable batteries through the charge port by the user.

Preferably, the lamp further comprises a switch 44A, wherein the switch 44A is arranged on the lower cover body 14A so as for controlling power supplying modes of the one or more batteries to the circuit board 30A through the switch 44A. For example, the lamp further comprises a set of at least one connection wire 50A, wherein the at least one connection wire 50A can be extended from the switch 44A and battery cartridge 42A to the circuit board 30A, so as for controlling the power supplying modes of the battery to the circuit board 30A through the switch 44A. Preferably, the spacer body 121A of the partition member 12A has a wiring channel 1211A arranged thereon, wherein the wiring channel 1211A is communicated with the mounting space 15A, wherein the at least one connection wire 50A is kept in the wiring channel 1211A of the spacer body 121A, so as to prevent the at least one connection wire 50A from affecting the illumination effect of the lamp and to conceal the at least one connection wire 50A.

Referring to FIGS. 5-7B, the lamp further comprises a carrying part 60A, wherein the carrying part 60A is arranged on the upper portion 101A of the lamp body 10A, so as to form, define and provide a carrying space 61A between the carrying part 60A and the upper cover body 13A of the lamp body 10A in order for allowing the lamp to be utilized in a carried manner. For instance, the user may move the lamp along with his/her movement through putting his/her finger into the carrying space 61A to carry the lamp through the carrying part 60A or the user may insert a carrying object into the carrying space 61A to hang the lamp on the carrying body.

Referring to FIGS. 8-12B, according to a third preferred embodiment of the present invention, a lamp is disclosed and illustrated in the following description. The lamp has an insect repellent state and an illumination state. The lamp in the insect repellent state can provide a function of insect repelling, while the lamp in the illumination state can mainly provide a function of illumination.

The lamp has a surrounding service mode and a side service mode, and that the illumination state of the lamp is arranged to be switchable between a surrounding lighting state and a side lighting state so as for the user to choose the service mode of the lamp based on the user's needs. Specifically, in the surrounding service mode, the lamp radiates light to the surrounding, while in the side service mode the lamp radiates light to one side only, that is at least a portion of the surrounding of the lamp is not radiated with light.

When the lamp is in the insect repellent state, the lamp can also be in the surrounding service mode or the side service mode. In other words, when the lamp is able to generate light and repel insects, the lamp is able to radiate light all around or to radiate light toward the predetermined side(s).

When the lamp is in the illumination state, the lamp can be in the surrounding service mode or the side service mode. In other words, when the lamp is able to generate light for illumination, the lamp is able to radiate light all around or to radiate light toward the predetermined side(s).

In particular, the lamp comprises a lamp body 10B, at least an illumination part 20B, and at least an insect repellent part 30B, wherein the illumination part 20B and the insect repellent part 30B are respectively mounted on the lamp body 10B.

The lamp body 10B has at least an optical cavity 100B. According to an embodiment that the lamp body 10B only has one optical cavity 100B, the illumination part 20B and the insect repellent part 30B are arranged in the same optical cavity 100B. Correspondingly, according to an embodiment that the lamp body 10B has two or more optical cavities 100B, the illumination part 20B and the insect repellent part 30B may be arranged in the same optical cavity 100B or be respectively arranged in different optical cavities 100B. The lamp body 10B has an upper portion 101B and a lower portion 102B, wherein the position of the upper portion 101B is higher than the position of the lower portion 102B. The optical cavities 100B are configured to be extended from the upper portion 101B to the lower portion 102B.

According to this third preferred embodiment of the present invention, the quantity of the optical cavity 100B of the lamp body 10B is embodied to be two. Besides, the two optical cavities are arranged in a back-to-back manner. When the lamp is hung and utilized, the light radiated from one of the optical cavities 100B of the lamp body 10B is projected towards one side, while the light radiated from the other optical cavities 100B of the lamp body 10B is projected towards the other side.

For example, one illumination part 20B is arranged in one of the optical cavities 100B of the lamp body 10B and one insect repellent part 30B is arranged in another one of the optical cavities 100B of the lamp body 10B, wherein when the illumination part 20B is powered to function, the corresponding optical cavity 100B of the lamp body 10B can produce light radiating outwards, and correspondingly, when the insect repellent part 30B is powered to repel insects, the corresponding optical cavity 100B of the lamp body 10B can produce light radiating outwards.

It is worth noted that the insect repellent part 30B can be embodied as a light source capable of radiating light of specific frequency. For example, the light generated by the insect repellent part 30B may be yellow light which is a light with invisible lights such as ultraviolet light, infrared light, and the like being filtered. Preferably, at least a portion of the light emitted by the insect repellent part 30B is visible light, so that when the lamp is functioning for insect repelling, it may also function for illumination.

When the illumination part 20B and the insect repellent part 30B are lighted up at the same time, the lamp is in the surrounding lighting state. The lamp can radiate lights all around and at least a portion of the light emitted by the lamp can be used for repelling insects.

When only the illumination parts 20B is lighted up, the lamp is in the side lighting state. The light emitted by the lamp is from one side and is capable of illuminating.

When only the insect repellent part 30B is lighted up, the lamp is in the side lighting state. The light emitted by the lamp is from one side and is capable of repelling insects. Of course, when the insect repellent light is a visible light, then the lamp may also serve for illuminating.

According to some other embodiments of the present invention, each of the optical cavities 100B of the lamp body 10B can be arranged to have one insect repellent part 30B and each of the optical cavities 100B can also be arranged to have one illumination part 20B. When the illumination part 20B and the insect repellent part 30B in the same optical cavity 100B of the lamp body 10B are both lighted, the lamp is capable of providing illumination of enough brightness and insect repellent function at the same time. When one optical cavity 100B of the two optical cavities 100B of the lamp body 10B is lighted, whether the illumination part 20B and/or the insect repellent part 30B is lighted, the lamp is in the side lighting state. When the two optical cavities 100B are both lighted up, whether it is the illumination part 20B and/or the insect repellent part 30B in one optical cavity 100B or the insect repellent part 30B and/or the illumination part 20B in the other optical cavity 100B, the lamp is in the surrounding lighting state.

Further, according to the present embodiment, when the lamp is in use when, for example, the user is able to sleep at night, the user may operate the lamp to switch it to the side service mode. Then the insect repellent part 30B of the lamp can still work on one side only for repelling insects. The insect repellent part 30B of the lamp may be arranged to be back to the user, so as to reduce the influence of the light emitted by the insect repellent part 30B to the sleep of the user as much as possible. In other words, the lamp is rotatable, so as to allow the insect repellent part 30B facing away from the user.

It is worth noting that, because the insect repellent part 30B may still produce light, therefore when the user wakes up at night and needs to find something in the dark, such as looking for a cellphone to tell the time, s/he can still rely on the light emitted by the insect repellent part 30B of the lamp to look for the object. Alternatively, the use may utilize the light emitted by the insect repellent part 30B of the lamp to find the lamp and then operate the lamp to light up the illumination part 20B of the lamp for illumination, so as for providing a stronger light for helping him/her in searching objects.

Figure 12A:
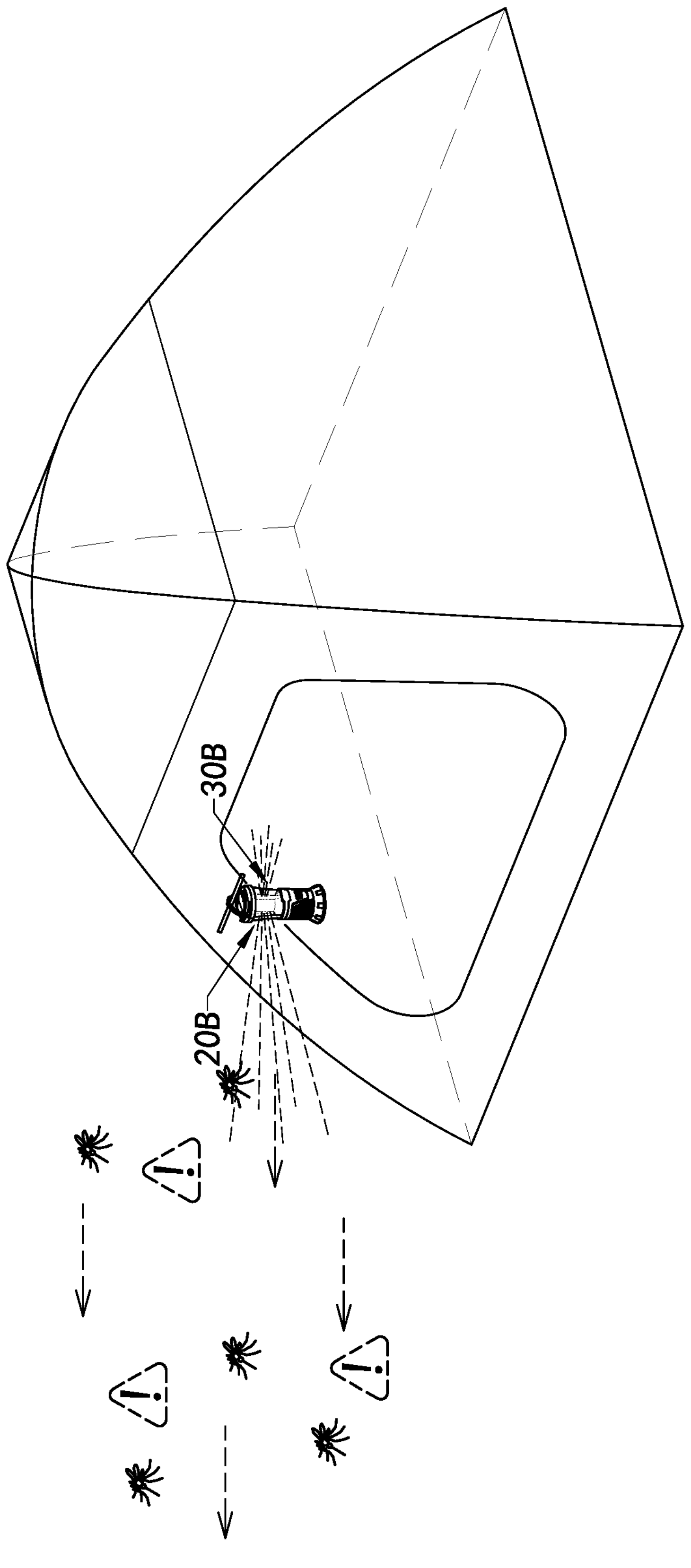
FIG. 12A is a schematic view illustrating an application of the lamp according to the above third preferred embodiment of the present invention.

Further, when the lamp is hung outside of the tent, as illustrated in FIG. 12A, the illumination part 20B of the lamp can be arranged facing away from the tent so as for radiating light toward the user outside of the tent. The insect repellent part 30B of the lamp is capable of facing toward the tent so as for radiating light toward the tent. Because the light emitted by the insect repellent part 30B is weaker than the light emitted by the illumination part 20B, the light emitted by the insect repellent part 30B has less influence to the user in the tent.

Figure 12B:
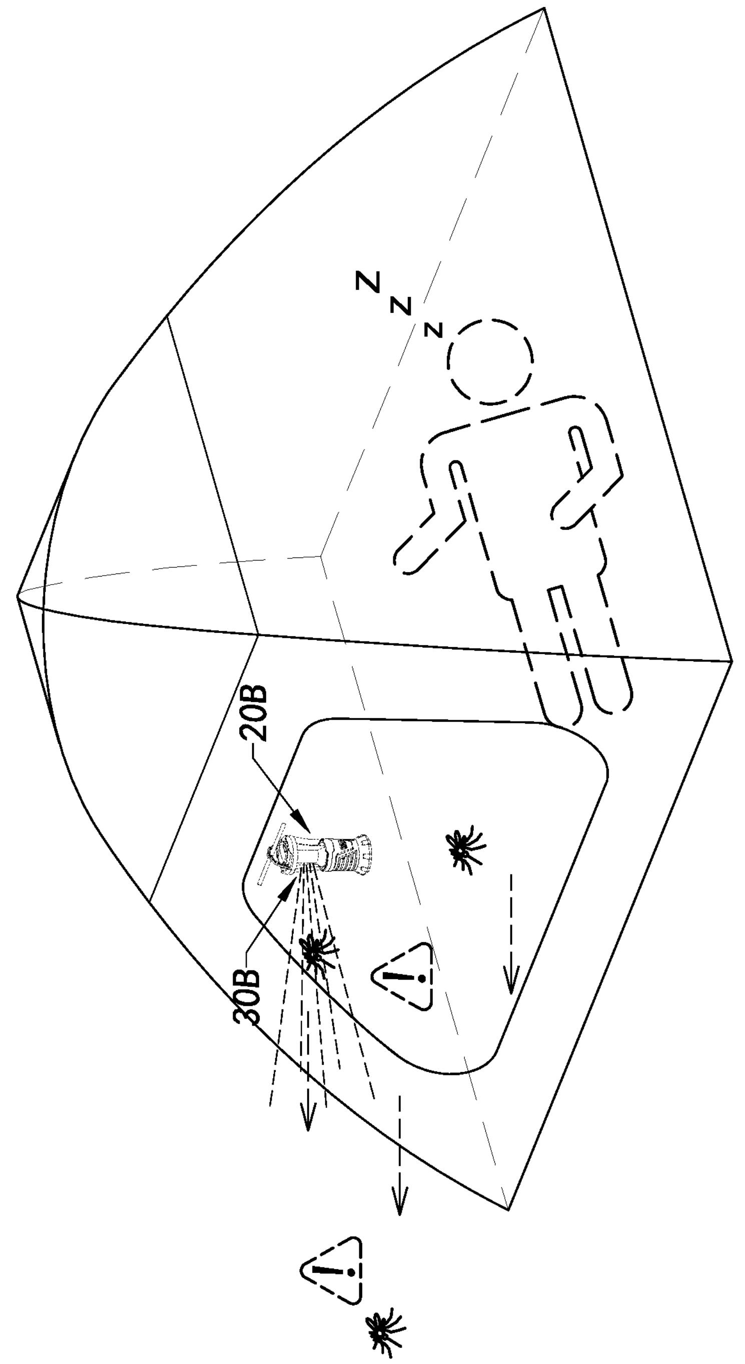
FIG. 12B is a schematic view illustrating an application of the lamp according to the above third preferred embodiment of the present invention.

When the lamp is placed and utilized in a tent, since some tents have screen window or screen door curtain, the insect repellent part 30B may still project its light outwards to repel the mosquitos outside the tent, as illustrated in FIG. 12B for example.

Figure 8:
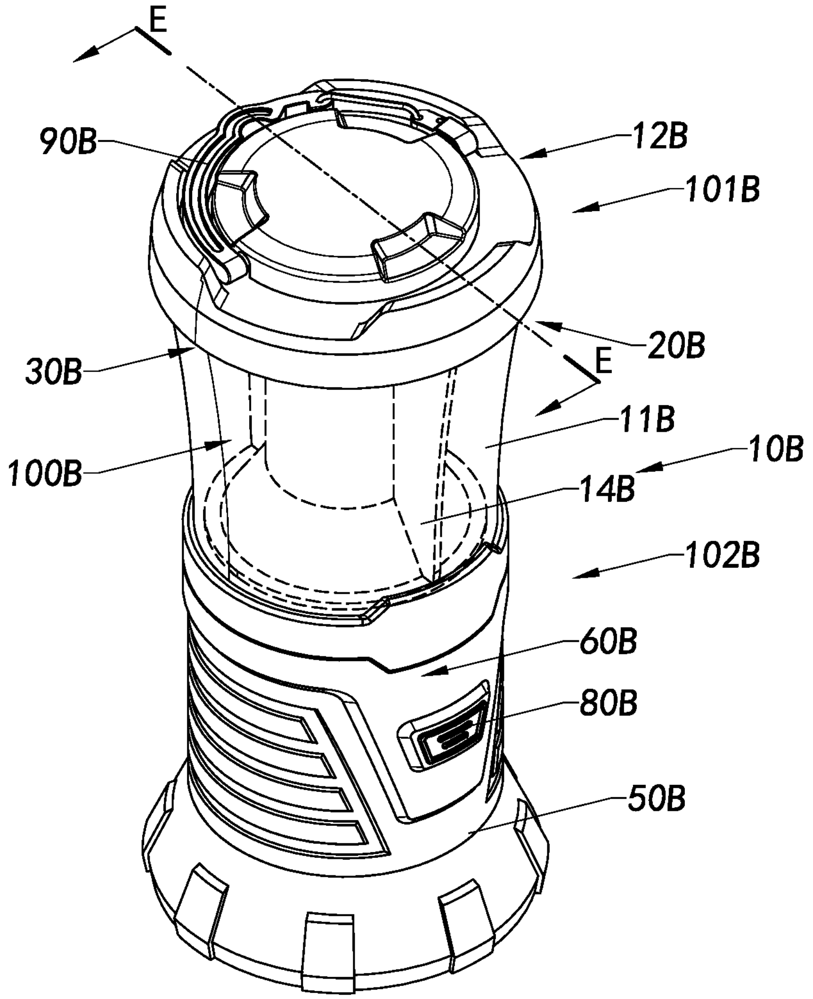
FIG. 8 is a perspective view of a lamp according to a third preferred embodiment of the present invention.
Figure 9:
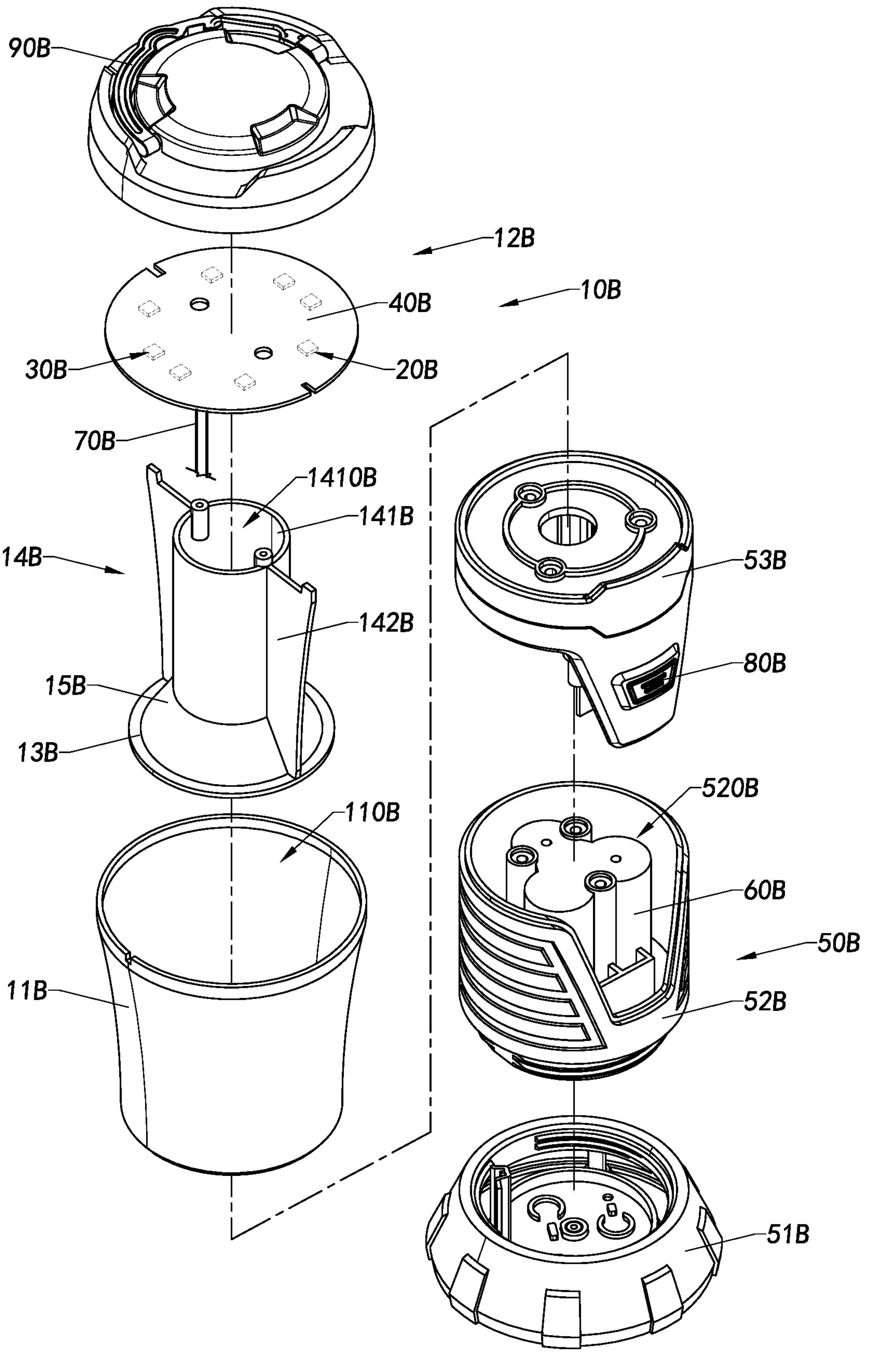
FIG. 9 is an exploded view of the lamp according to the above third preferred embodiment of the present invention.
Figure 10:
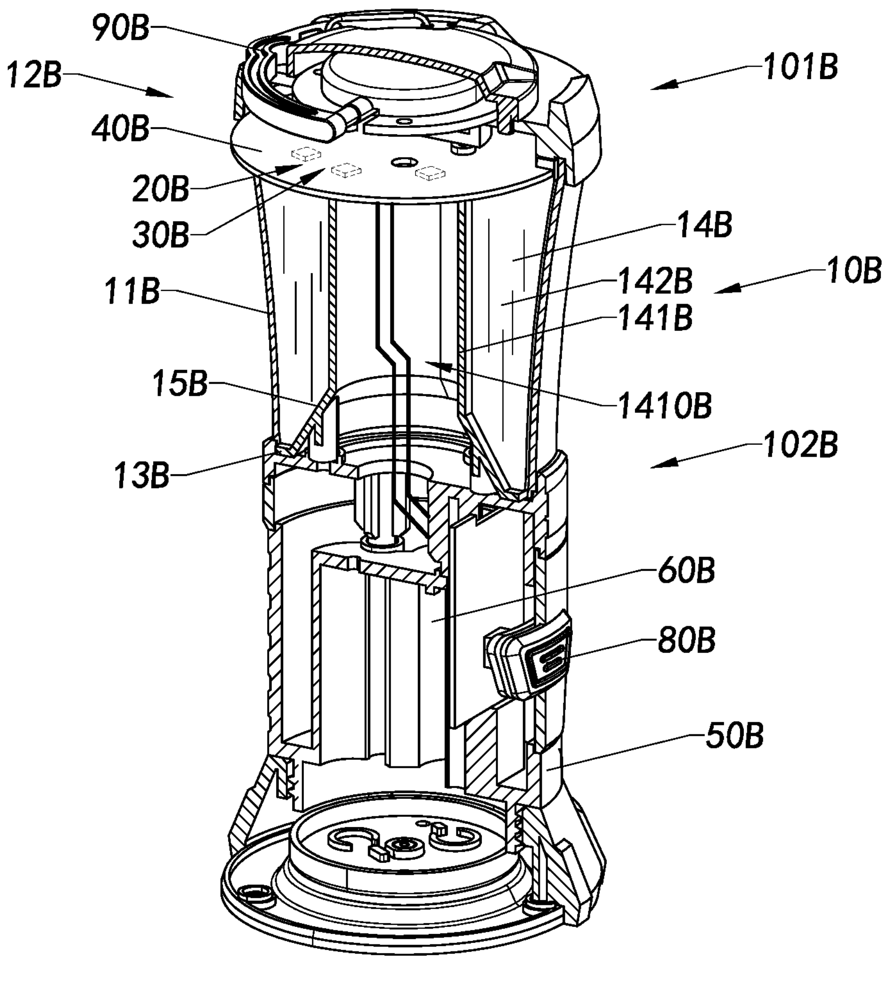
FIG. 10 is a sectional view illustrating the lamp according to the above third preferred embodiment of the present invention of FIG. 8 being sectioned along the E-E line.

Furthermore, referring to FIGS. 8 and 9, the lamp comprises a dividing element 14B, wherein the dividing element 14B divides the space between the upper portion 101B and the lower portion 102B of the lamp body 10B into the at least two optical cavities 100B.

In detail, referring to FIG. 9, the dividing element 14B comprises a spacer body 141B and at least two spacer boards 142B, wherein the spacer boards 142B is arranged to be formed through extending outwards from the sides of the spacer body 141B. Each of the spacer boards 142B is connected with the spacer body 141B. The spacer body 141B is arranged between the spacer boards 142B.

The lamp body 10B comprises a circular photopermeable wall 11B, a top cover 12B, a bottom cover 13B, and the dividing element 14B. The optical cavities 100B of the lamp body 10B are formed and defined between the top cover 12B and the bottom cover 13B. The dividing element 14B is extended between the top cover 12B and the bottom cover 13B. The photopermeable wall 11B is extended between the top cover 12B and the bottom cover 13B. The photopermeable wall 11B is arranged to surround around the dividing element 14B. The light emitted by the illumination part 20B or the insect repellent part 30B is blocked by the dividing element 14B and is merely allowed to pass through the photopermeable wall 11B to be transmitted outwardly.

The top cover 12B and the bottom cover 13B respectively close the space formed and defined by the photopermeable wall 11B from a top end position and a lower end position of the photopermeable wall 11B. The photopermeable wall 11B forms and defines an accommodation chamber 110B, wherein an upper portion and a lower portion of the accommodation chamber 110B are respectively closed by the top cover 12B and the bottom cover 13B. When the illumination part 20B or the insect repellent part 30B radiates light in the accommodation chamber 110B, because the top end and the bottom end of the photopermeable wall 11B are respectively closed by the top cover 12B and the bottom cover 13B, the light can therefore be concentrated in the accommodation chamber 110B, while the light is avoided from leaking from the top or the bottom of the photopermeable wall 11B as much as possible.

Further, the lamp comprises a circuit board 40B, wherein the circuit board 40B is positioned above the photopermeable wall 11B to close the top of the photopermeable wall 11B and provide an opening there. According to the present embodiment, the top cover 12B is embodied as the circuit board 40B. The at least one illumination part 20B is mounted on the circuit board 40B. The at least one insect repellent part 30B is mounted on the circuit board 40B as well. Besides, the illumination part 20B and the insect repellent part 30B are arranged respectively corresponding to different optical cavities 100B.

The dividing element 14B divides the accommodation chamber 110B formed and defined by the photopermeable wall 11B into the at least two optical cavities 100B of the lamp body 10B. The circuit board 40B faces toward the at least two optical cavities 100B, wherein at least one of the illumination parts 20B faces towards one of the optical cavities 100B, while at least one insect repellent part 30B faces toward the other one of the optical cavities 100B.

When the illumination part 20B or the insect repellent part 30B are lighted up, the light emitted by the illumination part 20B or the insect repellent part 30B radiates toward the position of the bottom cover 13B from the top to the bottom.

The bottom cover 13B forms a conical reflection wall 15B, wherein the reflection wall 15B is arranged to be oblique and formed through being extended downwardly and outwardly from the bottom end of the spacer body 141B of the dividing element 14B. When the light emitted by the illumination part 20B or the insect repellent part 30B radiates from the top downwardly to the reflection wall 15B of the bottom cover 13B, due to the reflection of the reflection wall 15B, the light is reflected by the reflection wall 15B to the photopermeable wall 11B to pass therethrough and outwardly transmit outside.

According to some other embodiments of the present invention, the illumination part 20B or the insect repellent part 30B may be mounted on the spacer body 141B or the spacer boards 142B of the dividing element 14B. The illumination part 20B or the insect repellent part 30B may radiate light outwardly along a horizontal direction.

According to some other embodiments of the present invention, the illumination part 20B or the insect repellent part 30B may be mounted on the bottom cover 13B. The illumination part 20B or the insect repellent part 30B may upwardly radiate light from the bottom to the top.

Person skilled in the art should understand that the above disclosures and illustrations are all examples for the arranging positions of the illumination part 20B and the insect repellent part 30B, but the arranging positions of the illumination part 20B and the insect repellent part 30B shall not be construed as limiting the scope of the claims of the present invention.

Further, the top ends of the spacer boards 142B of the dividing element 14B are tightly and closely attached on the circuit board 40 relatively, so as to minimize any light passing through the junction between the circuit board 40B and the top of the spacer boards 142B. The bottom end of the spacer boards 142B is fittingly and closely attached on the bottom cover 13B, so as to minimize any light passing through the junction between the bottom cover 13B and the bottom end of the spacer boards 142B.

Optionally, the spacer boards 142B and the bottom cover 13B are made integrally to form an integral body.

The side edges of the spacer boards 142B of the dividing element 14B are attached on the inner side of the photopermeable wall 11B, so as to reduce the interference of the light of the adjacent optical cavity 100B of the lamp body 10B. The shape of the photopermeable wall 11B may be, but not limited to, cylinder shape, circular cone shape, or stereoscopic shape.

Further, the lamp comprises a base 50B, a power supplying part 60B, and at least a conductive wire 70B, wherein the lamp body 10B is mounted on the base 50B. The power supplying part 60B is arranged on the base 50B. The base 50B can be stably supported on the bottom side of the lamp body 10B.

The connection wire 70B electrically links the power supplying part 60B and the circuit board 40B, so as for conducting electric power to the illumination part 20B or the insect repellent part 30B. It is worth noting that the illumination part 20B and the insect repellent part 30B may both be electrically linked with the same circuit board 40B or the illumination part 20B and the insect repellent part 30B may be electrically linked with different circuit boards 40B respectively.

The power supplying of the illumination part 20B and the insect repellent part 30B may share the same connection wire 70B or utilize different connection wires 70B.

The at least one connection wire 70B is extended from the power supplying part 60B of the base 50B at the bottom to the circuit board 40B at the top. In detail, the spacer body 141B of the dividing element 14B forms and defines a receiving chamber 1410B, wherein the receiving chamber 1410B is provided to be extended from the top to the bottom, wherein the at least one connection wire 70B passes through the bottom cover 13B of the lamp body 10B, then passes through the receiving chamber 1410B of the spacer body 141B of the dividing element 14B, and then extends to the position of the circuit board 40B.

In this way, the at least one connection wire 70B can be isolated relatively from the optical cavities 100B of the lamp body 10B. In other words, the at least one connection wire 70B passing through the lamp body 10B will not affect the illumination effect or the insect repelling effect of the lamp body 10B.

In detail, the base 50B comprises a base main body 51B, a battery cartridge body 52B and a battery cartridge cover 53B, wherein the battery cartridge body 52B and the battery cartridge cover 53B are supported on the base main body 51B. The battery cartridge body 52B is utilized for accommodating the power supplying part 60B. The power supplying part 60B may be embodied as one or more batteries, wherein the type of the battery may be, but not limited to, dry cell battery, rechargeable battery, and etc.

The battery cartridge body 52B forms a battery cartridge 520B, wherein the battery cartridge cover 53B is utilized for closing at least a portion of the battery cartridge 520B. The at least one connection wire 70B is extended outwardly from a charging port of the battery cartridge 520B to pass through the battery cartridge cover 53B and then pass through the dividing element 14B of the lamp body 10B to reach the circuit board 40B.

The battery cartridge cover 53B is detachably mounted on the battery cartridge body 52B. When the battery cartridge cover 53B is detached, the battery cartridge 520B of the battery cartridge body 52B will be exposed and accessed. Accordingly, it is easy and convenient to replace the one or more batteries of the battery cartridge body 52B.

The base main body 51B is detachably connected with the battery cartridge body 52B.

Further, the lamp comprises a controlling member 80B, wherein the controlling member 80B is arranged on the base 50B, such as on the battery cartridge cover 53B of the base 50B. The illumination part 20B and the insect repellent part 30B are respectively and controllably connected with the controlling member 80B.

The user may have the illumination part 20B of the lamp to start working or stop working or have the insect repellent part 30B of the lamp to start working or stop working through operating the controlling member 80B. The user may switch the lamp between the surrounding lighting state and the side lighting state through operating the controlling member 80B.

Figure 11:
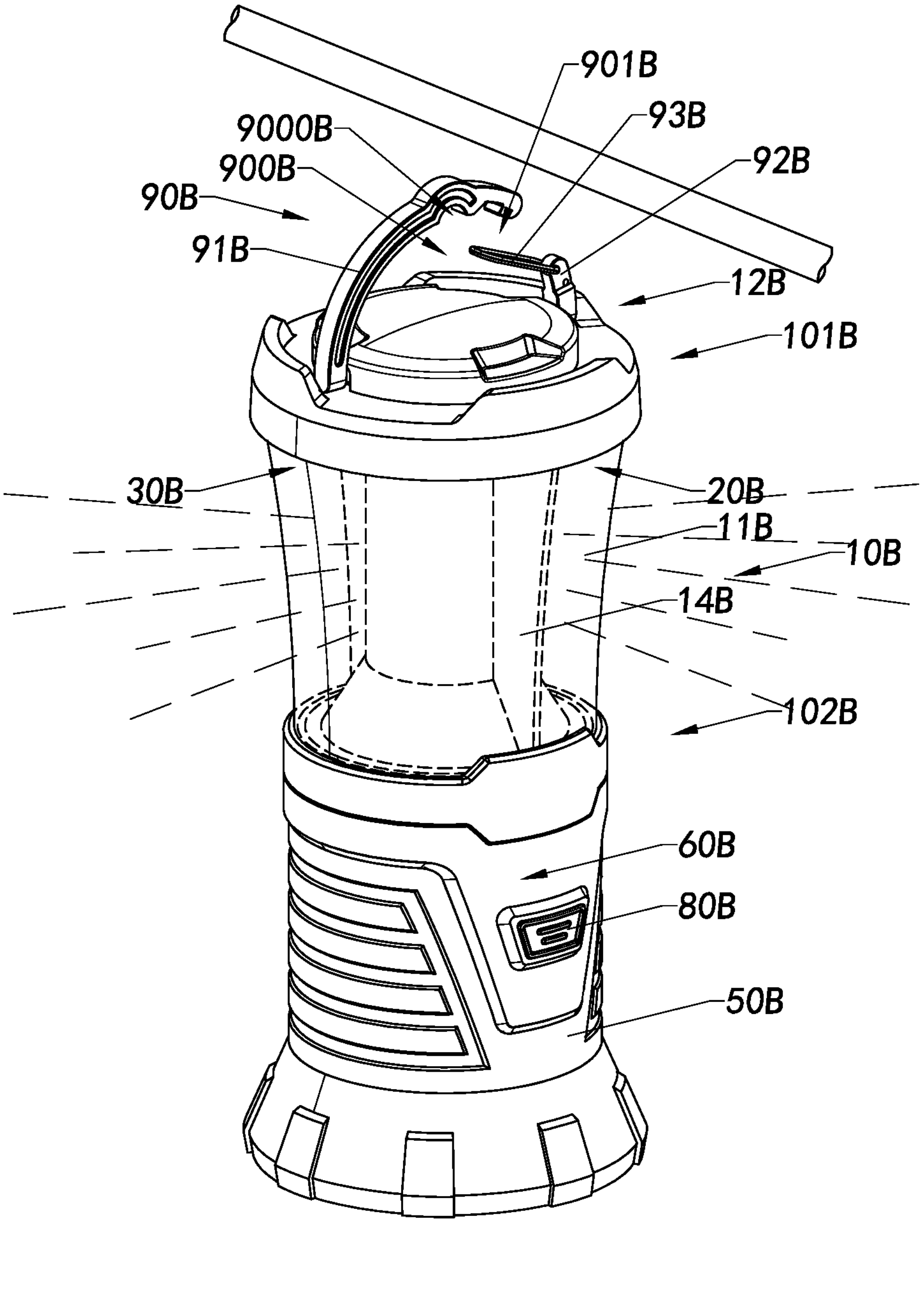
FIG. 11 is a schematic view illustrating an application of the lamp according to the above third preferred embodiment of the present invention.

Further, referring to FIG. 11, the lamp comprises a carrying part 90B, wherein the carrying part 90B is arranged on the upper portion 101B of the lamp body 10B. The carrying part 90B has a carrying space 900B formed between the carrying part 90B and the upper portion 101B of the lamp body 10B, so as to allow the user's finger to pass therethrough. The carrying part 90B is adapted for being held by the user. Alternatively, the user may insert a carrying object into the carrying space 900B, so as for hanging the lamp on the carrying object.

The carrying part 90B has a carrying groove 9000B formed therein, wherein the carrying groove 9000B is communicated with to the carrying space 900B, wherein the lamp allows the carrying object to be retained in the carrying groove 9000B of the carrying part 90B, so as to avoid any slide from occurring between of the lamp and the carrying object which causes rocking and inclination of the lamp.

Optionally, the carrying groove 9000B is positioned in the middle part of the carrying part, so as to facilitate the gravity centers of carrying groove 9000B and the lamp body 10B to align in the same line, such that when the lamp allows the carrying body to be held in the carrying groove 9000B of the carrying part 90B, the lamp body 10B of the lamp can be relatively stably hung on the carrying body. In this way, it may avoid the lamp from becoming oblique or inclined, turning the light emitted by the lamp uneven.

Optionally, the carrying part 90B is rotatably mounted on the upper portion 101B of the lamp body 10B, so as to allow the carrying part 90B to be folded and overlapped on the upper portion 101B of the lamp 10B in order to reduce of the size of the lamp when the lamp or the carrying part 90B is not in use.

Further, the carrying part 90B comprises a first carrying arm 91B, a second carrying arm 92B, and an opening and closing member 93B, wherein a mounting end of the first carrying arm 91B is mounted on the upper portion 101B of the lamp body 10B, a mounting end of the second carrying arm 92B is mounted on the upper portion 101B of the lamp body 10B, and the first carrying arm 91B and the second carrying arm 92B are respectively mounted on the upper portion 101B of the lamp body 10B in an opposite manner.

A carrying opening 901B is formed and defined between a free end of the first carrying arm 91B and a free end of the second carrying arm 92B. The opening and closing member 93B is arranged at the position of the carrying opening 901B, so as for controlling the opening and closing of the carrying opening 901B.

When the carrying opening 901B is opened, the carrying body is allowed to enter the carrying space 900B from the carrying opening 901B. When the carrying opening 901B is closed, the carrying body is allowed to leave the carrying space 900B from the carrying opening 901B.

An end of the opening and closing member 93B is connected with the free end of the first carrying arm 91B, while the other end of the opening and closing member 93B is detachably connected with the free end of the second carrying arm 92B. The opening and closing member 93B is arranged to be rotatably mounted on the free end of the first carrying arm 91B through the torsion spring. When the opening and closing member 93B rotates around the second carrying arm 92B through the torsion spring, the opening and closing member 93B is able to switch between an open state and a close state, so as to allow the carrying opening 901B to be opened or closed.

For the lamp of this embodiment, as illustrated in FIGS. 8-12B, the carrying opening 901B of the carrying part 90B is formed and defined on the side of the carrying part 90B, so as for the user to hang the lamp on the carrying object through hand-holding the lamp body 10B and/or the base 50B of the lamp. Specifically speaking, the user hand-holds the lamp body 10B and/or the base 50B. The opening and closing member 93B is allowed to align with the opening and closing member 93B and to be away from the lamp body 10B or to approach to the lamp body 10B and to push the opening and closing member 93B, so as to access and expose the carrying opening 901B. At this moment, the carrying object drives an end of the opening and closing member 93B to be separated from the free end of the second carrying arm 92B and open the carrying opening 901B and to distort the torsion spring held between the opening and closing member 93B and the first carrying arm 91B. After the carrying object enters the carrying space 900B of the carrying part 90B, the end of the opening and closing member 93B automatically swings to be connected to the free end of the second carrying arm 92B under the function of a torsion spring retained between the opening and closing member 93B and the first carrying arm 91B, so as for hanging the lamp on the carrying object.

It is worth noting that because of the carrying groove 9000B, the carrying body can be limited in the carrying groove 9000B of the carrying part 90B, so as to reduce the rocking and shaking between the lamp and the carrying object.

Further, according to another aspect of the present invention, the present invention provides an assembling method of lamp, including the steps of:

mounting the dividing element 14B to the photopermeable wall 11B so as to divide the accommodation chamber 110B encircled, formed, and defined by the photopermeable wall 11B into the at least two optical cavities 100B of the lamp body 10B; and allowing the circuit board 40B that closes the upper openings of the optical cavities 100B of the lamp body 10B to be arranged with at least one insect repellent part 30B at the upper ends of the optical cavities 100B of the lamp body 10B for assembling the lamp.

Optionally, before the mounting step, the circuit board 40B is electrically connected with an end of the at least one connection wire 70B, while the other end of the at least one connection wire 70B is electrically connected with the power supplying part 60B.

Optionally, the bottom cover 13B is formed and provided on the lower end of the dividing element 14B and the bottom cover 13B reflects at least a portion of the light emitted by the insect repellent part 30B to the photopermeable wall 11B.

Figure 13:
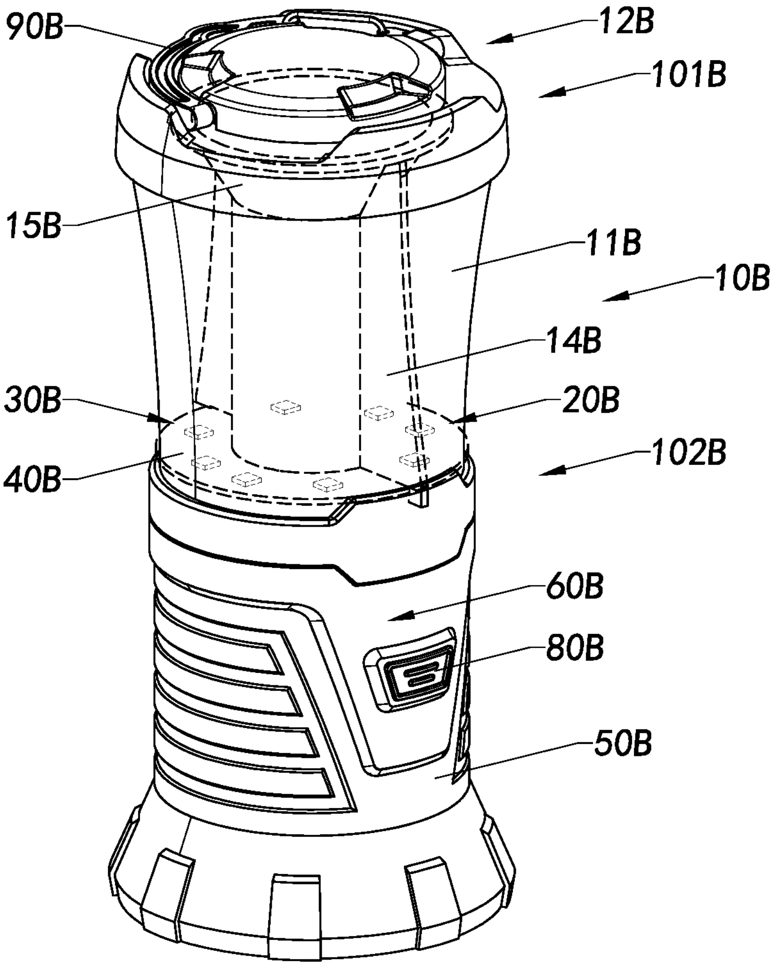
FIG. 13 is a perspective view of a lamp according to an alternative mode of the above preferred embodiments of the present invention.

Referring to FIG. 13, a lamp according to an alternative mode of the above preferred embodiments of the present invention is illustrated. A difference between this alternative mode and the above preferred embodiments is in the circuit board 40B.

According to this alternative mode, the circuit board 40B is mounted on the lower end of the photopermeable wall 11B, wherein the illumination part 20B and the insect repellent part 30B are both arranged on the circuit board 40B in a manner of facing upwards, so as to allow the light emitted by the illumination part 20B or the insect repellent part 30B entering the optical cavities 100B of the lamp body 10B and passing through the photopermeable wall 11B to radiate outwards.

The reflection wall 15B can be arranged at an upper end position of the photopermeable wall 11B so as for reflecting the light emitted by the illumination part 20B or the insect repellent part 30B to the photopermeable wall 11B, so as to ensure the light emitted by the illumination part 20B or the insect repellent part 30B to radiate outwards as much as possible.

Figure 14:
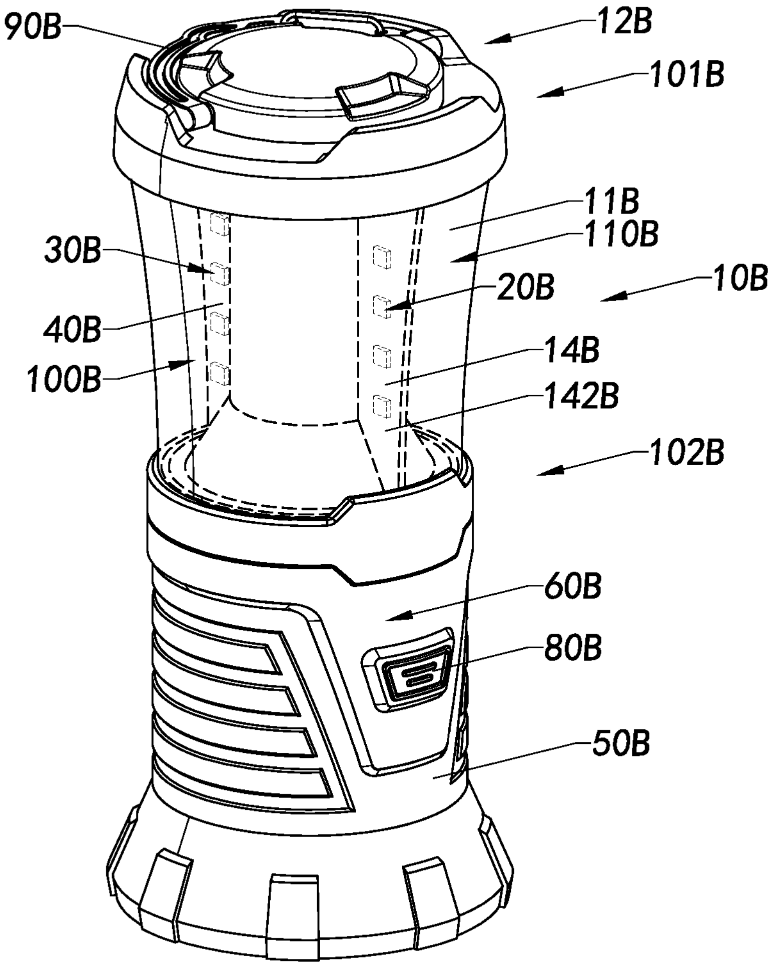
FIG. 14 is a perspective view of a lamp according to another alternative mode of the above preferred embodiments of the present invention.

Referring to FIG. 14, a lamp according to another alternative mode of the above preferred embodiments of the present invention is illustrated. A difference between this another alternative mode and the above preferred embodiment is in the circuit board 40B.

In this another alternative mode, the circuit board 40B is mounted within the photopermeable wall 11B and divides the accommodation chamber 110B formed and defined by the photopermeable wall 11B into the at least two optical cavities 100B of the lamp body 10B. In other words, the circuit board 40B also serves the function of the dividing element 14B.

The circuit board 40B has a back side and a front side, wherein the front side of the circuit board 40B faces toward one of the optical cavities 100B of the lamp body 10B, while the back side of the circuit board 40B faces toward the other one of the optical cavities 100B. At least one of the illumination parts 20B can be mounted on the circuit board 40B and positioned on the front side of the circuit board 40B. At least one of the insect repellent parts 30B can be mounted on the circuit board 40B and positioned on the front side of the circuit board 40B.

When one of the optical cavities 100B of the lamp body 10B illuminates, the other one of the optical cavities 100B may not illuminate, so that the lamp is in the side lighting state. Alternatively, both of the optical cavities 100B of the lamp body 10B may illuminate at the same time, so that the lamp is in the surrounding lighting state.

The side edges of the circuit board 40B are attached on the photopermeable wall 11B, so as to reduce the interferences of the lights between the adjacent optical cavities 100B of the lamp body 10B with each other.

It is worth noting that according to some other embodiments of the present invention, the quantity of the optical cavity 100B may be multiple, such as three or four. It is able to achieve the control of the quantity of the optical cavity 100B through controlling the quantity of the spacer board 142B of the dividing element 14B.

When the quantity of the optical cavity 100B of the lamp body 10B is three, one of the illumination parts 20B may be arranged in one of the optical cavities 100B, the other illumination part 20B may be arranged in another one of the optical cavities 100B, and one insect repellent part 30B may be arranged in the other one of the optical cavities 100B. Alternatively, one of the illumination parts 20B is arranged in one of the optical cavities 100B, while each of the other two of the optical cavities 100B has one insect repellent part 30B arranged therein. Alternatively, both the illumination part 20B and the insect repellent part 30B may also be arranged in the same optical cavity 100B.

In other words, for the same optical cavity 100B of the lamp body 10, the optical cavity 100B may have four states: one is to have the insect repellent part 30B to operate, one is to have the illumination part 20B to operate, one is to have both the insect repellent part 30B and the illumination part 20B to operate together, and the other one is to have both the insect repellent part 30B and the illumination part 20B not to operate. The optical cavity 100B may have two states as well. One is to have the insect repellent part 30B to operate, while the other state is to have the insect repellent part 30B not to operate. Alternatively, one is to have the illumination part 20B to operate or the illumination part 20B not to operate.

Figure 15:
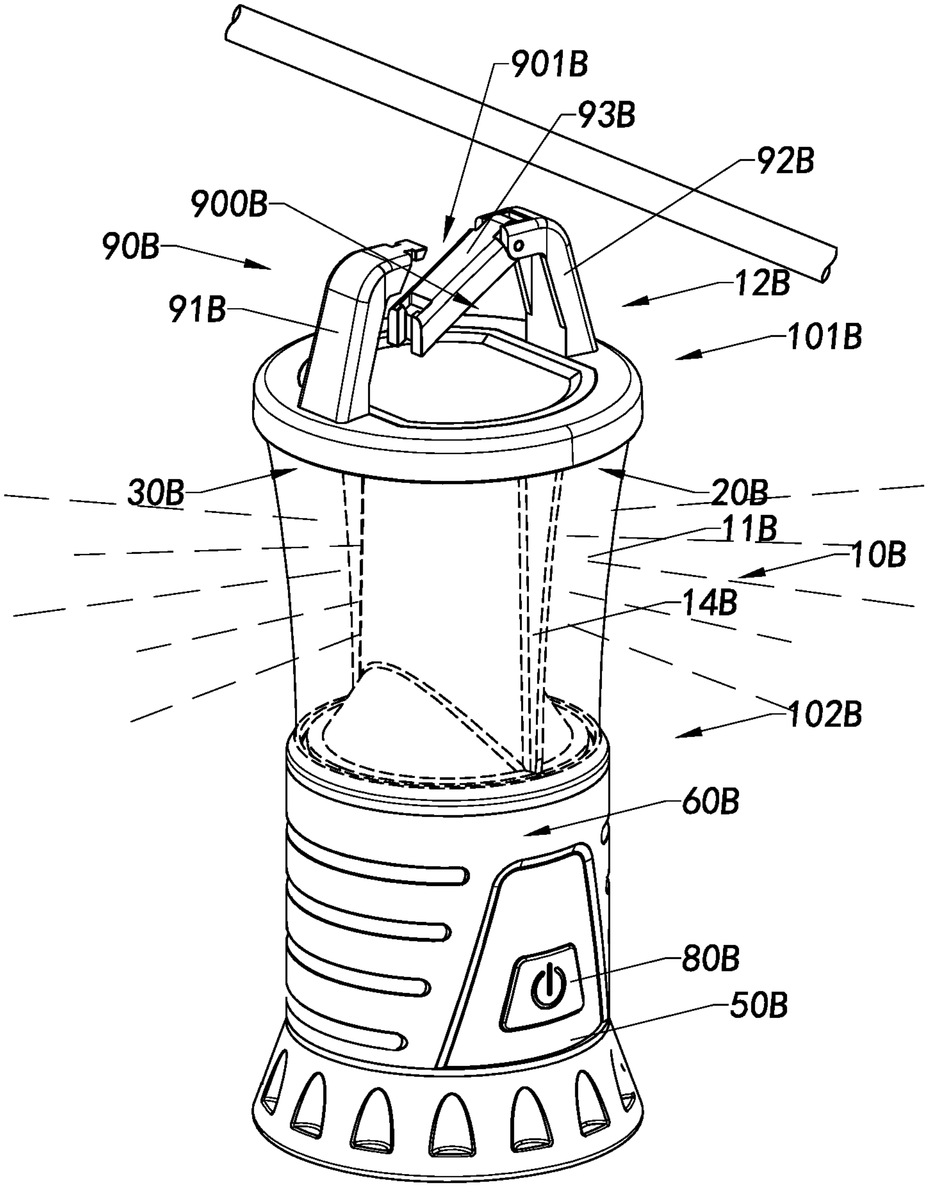
FIG. 15 is a perspective view of a lamp according to another alternative mode of the above preferred embodiments of the present invention.

Referring to FIG. 15, a lamp according to another alternative mode of the above preferred embodiments of the present invention is illustrated. A difference between the lamp according to this alternative mode and the lamp of the above preferred embodiment as illustrated in FIG. 8 is in the carrying part 90B and the controlling member 80B.

According to the this alternative mode, the carrying part 90B is embodied to be in an arch shape and at least a part of the first carrying arm 91B of the carrying part 90B and at least a part of the second carrying arm 92B are embodied to be in flat configuration that provides a flat connection between the first carrying arm 91B and the second carrying arm 92B. When the lamp is held at a certain position, the flat connection between the first carrying arm 91B and the second carrying arm 92B facilitates a stability of the hanging and holding of the lamp. In addition, the shape of the controlling member 80B is embodied as circular shape.

Person skilled in the art should be able to understand that the above embodiments are only for providing examples and features of different embodiments may be combined to obtain implementations that can easily be thought of based on the disclosure of the present invention, but have not been specified in the drawings.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A lamp, comprising:

at least two illumination parts;

a base having a battery cartridge arranged therein for installing one or more batteries;

a lamp body having an upper portion and a lower portion corresponding to the upper portion, wherein the lamp body comprises:

a photopermeable and circular surrounding wall having an accommodation space therein;

an opaque partition member dividing the accommodation space of the surrounding wall to form at least two optical cavities extending between the upper portion and the lower portion of the lamp body, wherein the at least two illumination parts are arranged to generate lights in the at least two optical cavities respectively, wherein the partition member is configured in such a manner that the light generated by one of the at least two illumination parts in one of the at least two optical cavities is only allowed radiating to outside through the surround wall and prevents from passing through the partition member to enter another one of the at least two optical cavities, wherein the partition member comprises:

a circular spacer body, having a wiring channel therein extending from the upper portion to the lower portion of the lamp body, arranged in the accommodation space of the surrounding wall, wherein a circular cross section of the spacer body and a circular cross section of the surrounding wall are concentrically arranged; and at least two spacer boards respectively extended between an outer wall of the spacer body and an inner wall of the surrounding wall in a spaced manner with respect to each other, wherein two ends of each of the at least two spacer boards and the spacer body are respectively extended to the upper portion and the lower portion of the lamp body so as to define the at least two optical cavities between the surrounding wall and the spacer body and at least two spacer boards respectively, wherein an outer edge of each of the at least two spacer boards is extended to the inner wall of the surrounding wall in such a manner that a radian of an outer edge of each of the at least two spacer boards is consistent to a radian of the inner wall of the surrounding wall, such that when the one of the at least two illumination parts arranged in one of the at least two optical cavities generates the light, the spacer body and the at least two spacer boards of the partition member block the light from entering the another one of the at least two optical cavities, wherein an outer wall of the spacer body and outer walls of the at least two spacer boards have a reflection layer for reflecting the lights generated by the at least two illumination parts to pass through the surrounding wall and radiate to the outside;

an upper cover body arranged on the upper portion configured to close upper openings of the at least two optical cavities;

a lower cover body arranged on the lower portion configured to close lower openings of the at least two optical cavities; and a conical oblique inner wall obliquely extended from the spacer body towards an edge direction of the lower cover body downwardly and outwardly, wherein the at least two illumination parts face towards the oblique inner wall such that the lights generated by the at least two illumination parts is able to be reflected by the oblique inner wall to pass through the surrounding wall and radiate to the outside;

a circuit board arranged in the upper cover body, wherein the at least two illumination parts are arranged on the circuit board such that the two illumination parts are held on the upper portion of the lamp body to generate the lights in the at least two optical cavities respectively; and a set of one or more connection wires extended in the wiring channel of the spacer body for electrically connecting the one or more battery in the battery cartridge with the circuit board.

2. The lamp, as recited in claim 1, wherein at least one of the at least two spacer boards of the partition member is extended upwardly to form a positioning bulge and the circuit board has at least a position notch, wherein the positioning bulge is kept in the positioning notch so as to ensure a mounting position and a mounting angle of the circuit board and the at least two illumination parts to be positioned and arranged at upper ends of the at least two optical cavities respectively for arranging the at least two illumination parts in the at least two optical cavities respectively, that avoids dislocations of the at least two illumination parts and the at least two optical cavities.

3. The lamp, as recited in claim 1, further comprising a carrying part arranged on the upper portion of the lamp body while a carrying space is defined and provided between the carrying part and the upper cover body of the lamp body.

4. The lamp, as recited in claim 3, wherein the carrying part has a carrying groove communicated with the carrying space, wherein the carrying groove is arranged on a middle part of the carrying part.

5. The lamp, as recited in claim 3, wherein the carrying part comprises a first carrying arm, a second carrying arm and a locking member, wherein a mounting end of the first carrying arm and a mounting end of the second carrying arm are corresponding to each other and are rotatably mounted on two opposite sides of the upper cover body of the lamp body respectively, so as to correspond a free end of the first carrying arm and a free end of the second carrying arm on sides of the carrying part respectively, wherein the free end of the first carrying arm and the free end of the second carrying arm jointly provide a carrying opening therebetween, wherein an end of the locking member is rotatably mounted on the free end of the first carrying arm, while another end of the locking member is detachably connected with the free end of the second carrying arm, so as to allow the locking member to open and close the carrying opening.

6. The lamp, as recited in claim 4, wherein the carrying part comprises a first carrying arm, a second carrying arm and a locking member, wherein a mounting end of the first carrying arm and a mounting end of the second carrying arm are corresponding to each other and are rotatably mounted on two opposite sides of the upper cover body of the lamp body respectively, so as to correspond a free end of the first carrying arm and a free end of the second carrying arm on sides of the carrying part respectively, wherein the free end of the first carrying arm and the free end of the second carrying arm jointly provide a carrying opening therebetween, wherein an end of the locking member is rotatably mounted on the free end of the first carrying arm, while another end of the locking member is detachably connected with the free end of the second carrying arm, so as to allow the locking member to open and close the carrying opening.

7. The lamp, as recited in claim 2, further comprising a carrying part arranged on the upper portion of the lamp body while a carrying space is defined and provided between the carrying part and the upper cover body of the lamp body.

8. The lamp, as recited in claim 7, wherein the carrying part has a carrying groove communicated with the carrying space, wherein the carrying groove is arranged on a middle part of the carrying part.

9. The lamp, as recited in claim 7, wherein the carrying part comprises a first carrying arm, a second carrying arm and a locking member, wherein a mounting end of the first carrying arm and a mounting end of the second carrying arm are corresponding to each other and are rotatably mounted on two opposite sides of the upper cover body of the lamp body respectively, so as to correspond a free end of the first carrying arm and a free end of the second carrying arm on sides of the carrying part respectively, wherein the free end of the first carrying arm and the free end of the second carrying arm jointly provide a carrying opening therebetween, wherein an end of the locking member is rotatably mounted on the free end of the first carrying arm, while another end of the locking member is detachably connected with the free end of the second carrying arm, so as to allow the locking member to open and close the carrying opening.

10. The lamp, as recited in claim 8, wherein the carrying part comprises a first carrying arm, a second carrying arm and a locking member, wherein a mounting end of the first carrying arm and a mounting end of the second carrying arm are corresponding to each other and are rotatably mounted on two opposite sides of the upper cover body of the lamp body respectively, so as to correspond a free end of the first carrying arm and a free end of the second carrying arm on sides of the carrying part respectively, wherein the free end of the first carrying arm and the free end of the second carrying arm jointly provide a carrying opening therebetween, wherein an end of the locking member is rotatably mounted on the free end of the first carrying arm, while another end of the locking member is detachably connected with the free end of the second carrying arm, so as to allow the locking member to open and close the carrying opening.

11. A lamp, comprising:

at least two illumination parts;

a lamp body having an upper portion and a lower portion corresponding to the upper portion, wherein the lamp body comprises:

a photopermeable and circular surrounding wall having an accommodation space therein;

an opaque partition member dividing the accommodation space of the surrounding wall to form at least two optical cavities extending between the upper portion and the lower portion of the lamp body, wherein the at least two illumination parts are arranged to generate lights in the at least two optical cavities respectively, wherein the partition member is configured in such a manner that the light generated by one of the at least two illumination parts in one of the at least two optical cavities is only allowed radiating to outside through the surround wall and prevents from passing through the partition member to enter another one of the at least two optical cavities, wherein the partition member comprises:

a circular spacer body arranged in the accommodation space of the surrounding wall, wherein a circular cross section of the spacer body and a circular cross section of the surrounding wall are concentrically arranged; and at least two spacer boards respectively extended between an outer wall of the spacer body and an inner wall of the surrounding wall in a spaced manner with respect to each other, wherein two ends of each of the at least two spacer boards and the spacer body are respectively extended to the upper portion and the lower portion of the lamp body so as to define the at least two optical cavities between the surrounding wall and the spacer body and at least two spacer boards respectively, wherein an outer edge of each of the at least two spacer boards is extended to the inner wall of the surrounding wall in such a manner that a radian of an outer edge of each of the at least two spacer boards is consistent to a radian of the inner wall of the surrounding wall, such that when the one of the at least two illumination parts arranged in one of the at least two optical cavities generates the light, the spacer body and the at least two spacer boards of the partition member block the light from entering the another one of the at least two optical cavities, wherein an outer wall of the spacer body and outer walls of the at least two spacer boards have a reflection layer for reflecting the lights generated by the at least two illumination parts to pass through the surrounding wall and radiate to the outside;

an upper cover body arranged on the upper portion configured to close upper openings of the at least two optical cavities;

a lower cover body arranged on the lower portion configured to close lower openings of the at least two optical cavities; and a conical oblique inner wall obliquely extended from the spacer body towards an edge direction of the upper cover body upwardly and outwardly, wherein the at least two illumination parts face towards the oblique inner wall such that the lights generated by the at least two illumination parts is able to be reflected by the oblique inner wall to pass through the surrounding wall and radiate to the outside; and a circuit board arranged in the lower cover body, wherein the at least two illumination parts are arranged on the circuit board such that the two illumination parts are held on the lower portion of the lamp body to generate the lights in the at least two optical cavities respectively.

12. The lamp, as recited in claim 11, wherein at least one of the at least two spacer boards of the partition member is extended upwardly to form a positioning bulge and the circuit board has at least a position notch, wherein the positioning bulge is kept in the positioning notch so as to ensure a mounting position and a mounting angle of the circuit board and the at least two illumination parts to be positioned and arranged at upper ends of the at least two optical cavities respectively for arranging the at least two illumination parts in the at least two optical cavities respectively, that avoids dislocations of the at least two illumination parts and the at least two optical cavities.

13. The lamp, as recited in claim 11, further comprising a carrying part arranged on the upper portion of the lamp body while a carrying space is defined and provided between the carrying part and the upper cover body of the lamp body.

14. The lamp, as recited in claim 13, wherein the carrying part has a carrying groove communicated with the carrying space, wherein the carrying groove is arranged on a middle part of the carrying part.

15. The lamp, as recited in claim 13, wherein the carrying part comprises a first carrying arm, a second carrying arm and a locking member, wherein a mounting end of the first carrying arm and a mounting end of the second carrying arm are corresponding to each other and are rotatably mounted on two opposite sides of the upper cover body of the lamp body respectively, so as to correspond a free end of the first carrying arm and a free end of the second carrying arm on sides of the carrying part respectively, wherein the free end of the first carrying arm and the free end of the second carrying arm jointly provide a carrying opening therebetween, wherein an end of the locking member is rotatably mounted on the free end of the first carrying arm, while another end of the locking member is detachably connected with the free end of the second carrying arm, so as to allow the locking member to open and close the carrying opening.

16. The lamp, as recited in claim 14, wherein the carrying part comprises a first carrying arm, a second carrying arm and a locking member, wherein a mounting end of the first carrying arm and a mounting end of the second carrying arm are corresponding to each other and are rotatably mounted on two opposite sides of the upper cover body of the lamp body respectively, so as to correspond a free end of the first carrying arm and a free end of the second carrying arm on sides of the carrying part respectively, wherein the free end of the first carrying arm and the free end of the second carrying arm jointly provide a carrying opening therebetween, wherein an end of the locking member is rotatably mounted on the free end of the first carrying arm, while another end of the locking member is detachably connected with the free end of the second carrying arm, so as to allow the locking member to open and close the carrying opening.

17. The lamp, as recited in claim 12, further comprising a carrying part arranged on the upper portion of the lamp body while a carrying space is defined and provided between the carrying part and the upper cover body of the lamp body.

18. The lamp, as recited in claim 17, wherein the carrying part has a carrying groove communicated with the carrying space, wherein the carrying groove is arranged on a middle part of the carrying part.

19. The lamp, as recited in claim 17, wherein the carrying part comprises a first carrying arm, a second carrying arm and a locking member, wherein a mounting end of the first carrying arm and a mounting end of the second carrying arm are corresponding to each other and are rotatably mounted on two opposite sides of the upper cover body of the lamp body respectively, so as to correspond a free end of the first carrying arm and a free end of the second carrying arm on sides of the carrying part respectively, wherein the free end of the first carrying arm and the free end of the second carrying arm jointly provide a carrying opening therebetween, wherein an end of the locking member is rotatably mounted on the free end of the first carrying arm, while another end of the locking member is detachably connected with the free end of the second carrying arm, so as to allow the locking member to open and close the carrying opening.

20. The lamp, as recited in claim 18, wherein the carrying part comprises a first carrying arm, a second carrying arm and a locking member, wherein a mounting end of the first carrying arm and a mounting end of the second carrying arm are corresponding to each other and are rotatably mounted on two opposite sides of the upper cover body of the lamp body respectively, so as to correspond a free end of the first carrying arm and a free end of the second carrying arm on sides of the carrying part respectively, wherein the free end of the first carrying arm and the free end of the second carrying arm jointly provide a carrying opening therebetween, wherein an end of the locking member is rotatably mounted on the free end of the first carrying arm, while another end of the locking member is detachably connected with the free end of the second carrying arm, so as to allow the locking member to open and close the carrying opening.

* * * * *